US011480368B2

(12) United States Patent
Lee et al.

(10) Patent No.: US 11,480,368 B2
(45) Date of Patent: Oct. 25, 2022

(54) GAS HEAT PUMP SYSTEM

(71) Applicant: LG ELECTRONICS INC., Seoul (KR)

(72) Inventors: Jinwoo Lee, Seoul (KR); Minho Chung, Seoul (KR); Song Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 84 days.

(21) Appl. No.: 16/770,994

(22) PCT Filed: Dec. 12, 2018

(86) PCT No.: PCT/KR2018/015797
§ 371 (c)(1),
(2) Date: Jun. 9, 2020

(87) PCT Pub. No.: WO2019/117630
PCT Pub. Date: Jun. 20, 2019

(65) Prior Publication Data
US 2020/0393174 A1    Dec. 17, 2020

(30) Foreign Application Priority Data
Dec. 12, 2017 (KR) .................. 10-2017-0170193

(51) Int. Cl.
*F25B 30/06* (2006.01)
*F01N 3/02* (2006.01)
*F01P 5/02* (2006.01)

(52) U.S. Cl.
CPC ................ *F25B 30/06* (2013.01); *F01N 3/02* (2013.01); *F01N 3/0205* (2013.01); *F01P 5/02* (2013.01); *F25B 2327/001* (2013.01)

(58) Field of Classification Search
CPC .......... F25B 30/06; F25B 30/02; F25B 30/00; F01N 3/02; F01P 5/02; F01P 5/10;
(Continued)

(56) References Cited

U.S. PATENT DOCUMENTS 4,187,678 A    2/1980  Herenius
6,226,981 B1 *  5/2001  Bruch ................ F02M 21/0215
                                                  60/274
(Continued)

FOREIGN PATENT DOCUMENTS

JP    08-014025      1/1996
JP    0814025   A *  1/1996
(Continued)

OTHER PUBLICATIONS

International Search Report dated Mar. 14, 2019 issued in Application No. PCT/KR2018/015797.
(Continued)

*Primary Examiner* — Devon C Kramer
*Assistant Examiner* — Kelsey L Stanek
(74) *Attorney, Agent, or Firm* — KED & Associates

(57) ABSTRACT

The present invention relates to a gas heat pump system. The gas heat pump system, according to one embodiment of the present invention, comprises: an air conditioning module comprising a compressor, an outdoor heat exchanger, an expansion apparatus, an indoor heat exchanger and a refrigerant line; and an engine module comprising an engine for combusting a mixture of fuel and air, thereby providing power for driving the compressor. The engine module comprises: a mixer for mixing and discharging the air and fuel; a supercharging means for receiving the mixture discharged from the mixer, compressing same, and then discharging same; an intercooler for receiving the mixture compressed in the supercharging means, cooling same by a heat exchange (Continued)

method, increasing the density thereof, and then discharging same; an adjustment means for receiving the mixture discharged from the intercooler, adjusting the quantity thereof, and then supplying same to the engine; and an exhaust gas heat exchanger for exchanging heat between a coolant and exhaust gas discharged from the engine.

30 Claims, 17 Drawing Sheets

(58) Field of Classification Search
CPC ........ F02B 37/04; F02B 39/10; F02B 37/004; F02B 37/013
See application file for complete search history.

(56) References Cited

U.S. PATENT DOCUMENTS

| | | | |
|---|---|---|---|
| 7,145,258 B2 | 12/2006 | Kang | |
| 2002/0029570 A1* | 3/2002 | Baeuerle | F01N 3/28 60/616 |
| 2005/0061303 A1 | 3/2005 | Kuzuyama | |
| 2006/0037347 A1* | 2/2006 | Kang | F25D 21/04 62/323.3 |
| 2006/0130470 A1 | 6/2006 | Dorn et al. | |
| 2007/0062490 A1 | 3/2007 | Yang | |
| 2008/0190108 A1 | 8/2008 | Eitel | |
| 2012/0216760 A1 | 8/2012 | Gibby | |
| 2013/0167813 A1 | 7/2013 | Kuehnel | |
| 2016/0115853 A1* | 4/2016 | Yang | F01N 3/106 60/299 |
| 2017/0089617 A1 | 3/2017 | Choi | |

FOREIGN PATENT DOCUMENTS

| | | | | |
|---|---|---|---|---|
| JP | 2000-008961 | | 1/2000 | |
| JP | 2000008961 A | * | 1/2000 | |
| JP | 2000-045758 | | 2/2000 | |
| JP | 2000045758 A | * | 2/2000 | |
| JP | 2001-355994 | | 12/2001 | |
| JP | 2001355994 A | * | 12/2001 | |
| JP | 2002-019456 | | 1/2002 | |
| JP | 2002019456 A | * | 1/2002 | ................ F01P 3/12 |
| JP | 2004085091 A | * | 3/2004 | |
| JP | 2006-090209 | | 4/2006 | |
| JP | 2006090209 A | * | 4/2006 | |
| JP | 2009-047138 | | 3/2009 | |
| JP | 2016-164399 | | 9/2016 | |
| KR | 10-0550574 | | 2/2006 | |
| KR | 10-2008-0008776 | | 1/2008 | |
| KR | 10-2013-0094929 | | 8/2013 | |
| KR | 10-2015-0048403 | | 5/2015 | |
| KR | 101533157 B1 | * | 7/2015 | |
| KR | 10-1714900 | | 3/2017 | |
| WO | WO 2016/114448 | | 7/2016 | |

OTHER PUBLICATIONS

European Search Report dated Mar. 11, 2021.
International Search Report dated Mar. 11, 2019 issued in Application No. PCT/KR2018/015799.
U.S. Office Action issued in U.S. Appl. No. 16/771,833 dated May 2, 2022.

* cited by examiner

[Fig. 1]
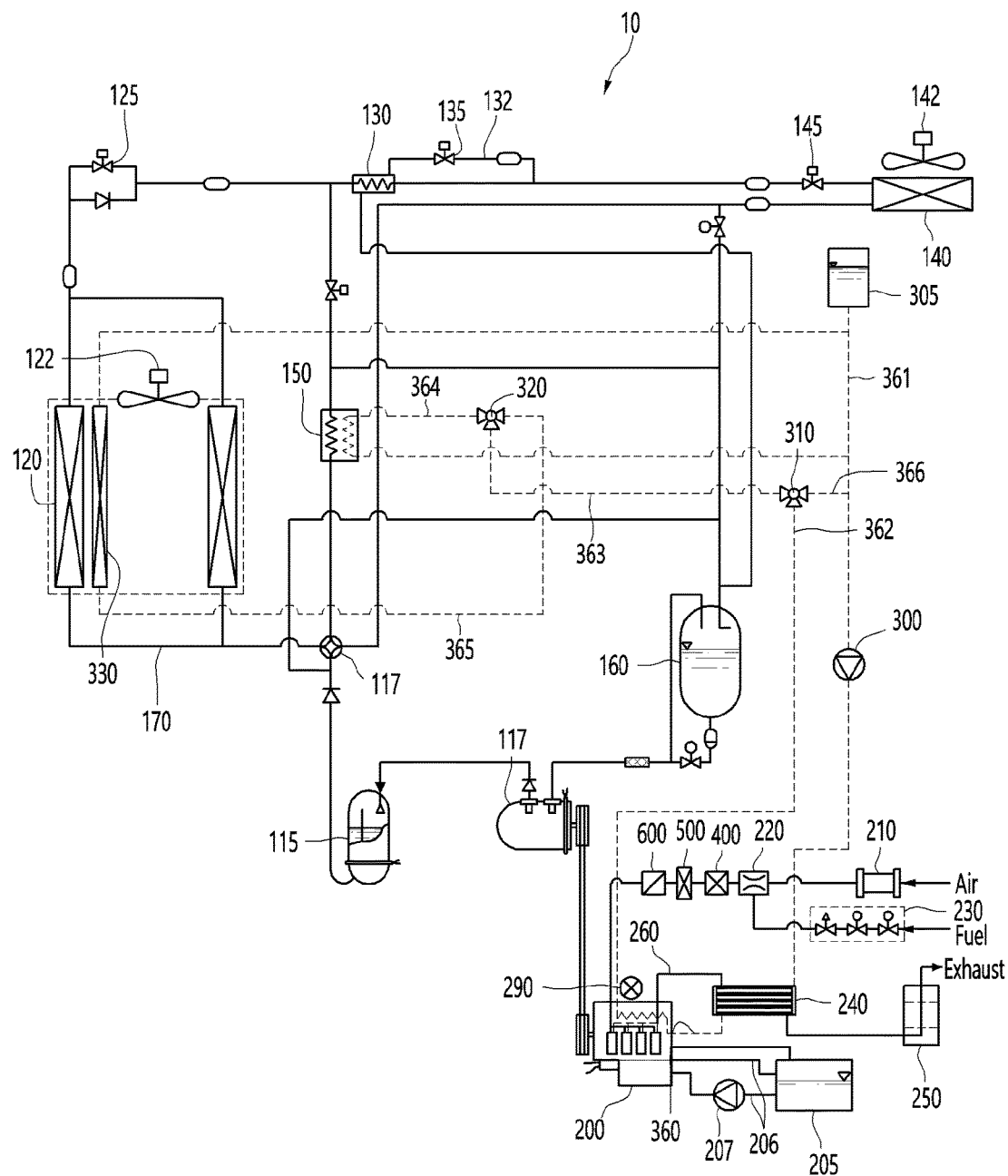

[Fig. 2]
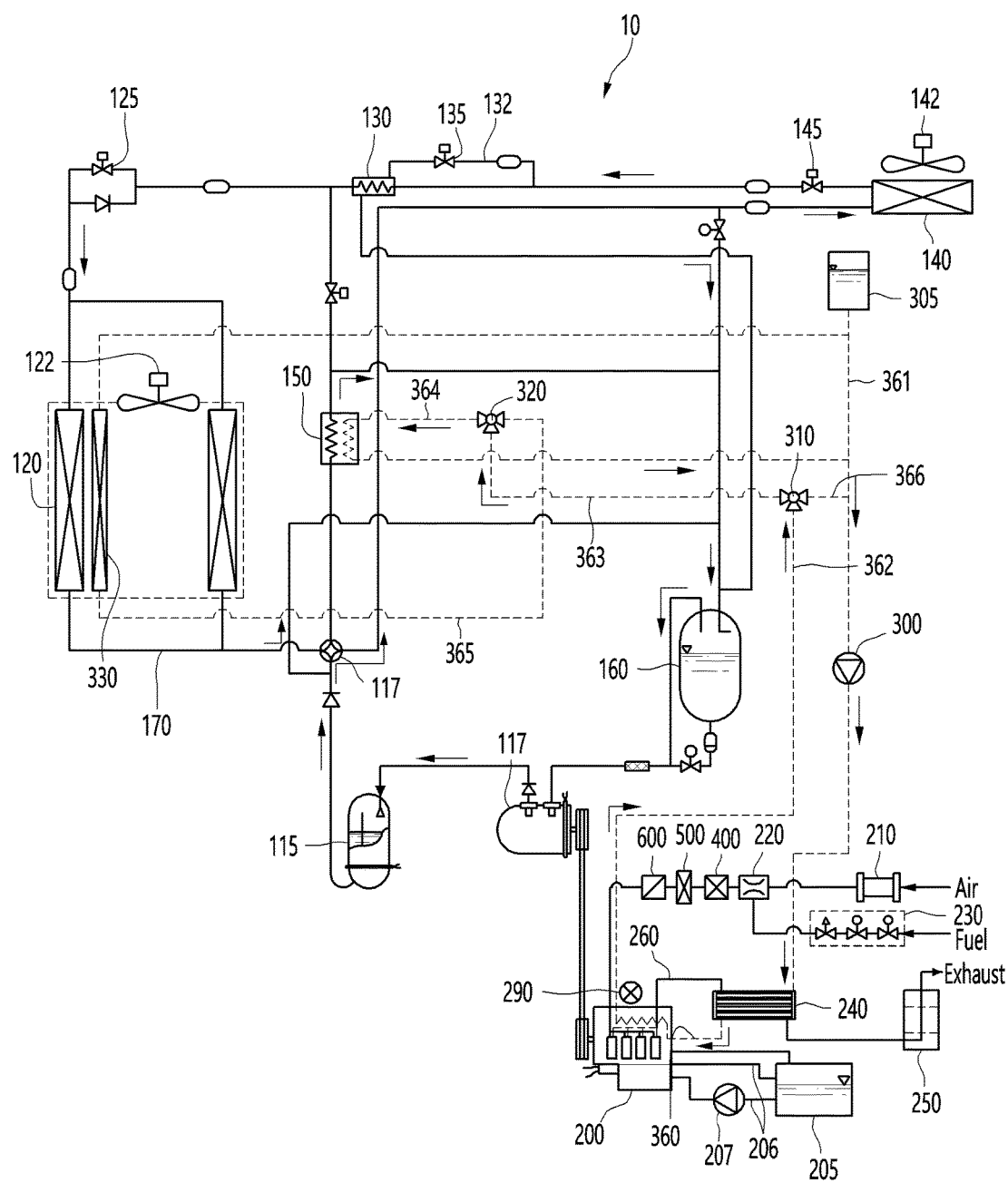

[Fig. 3]
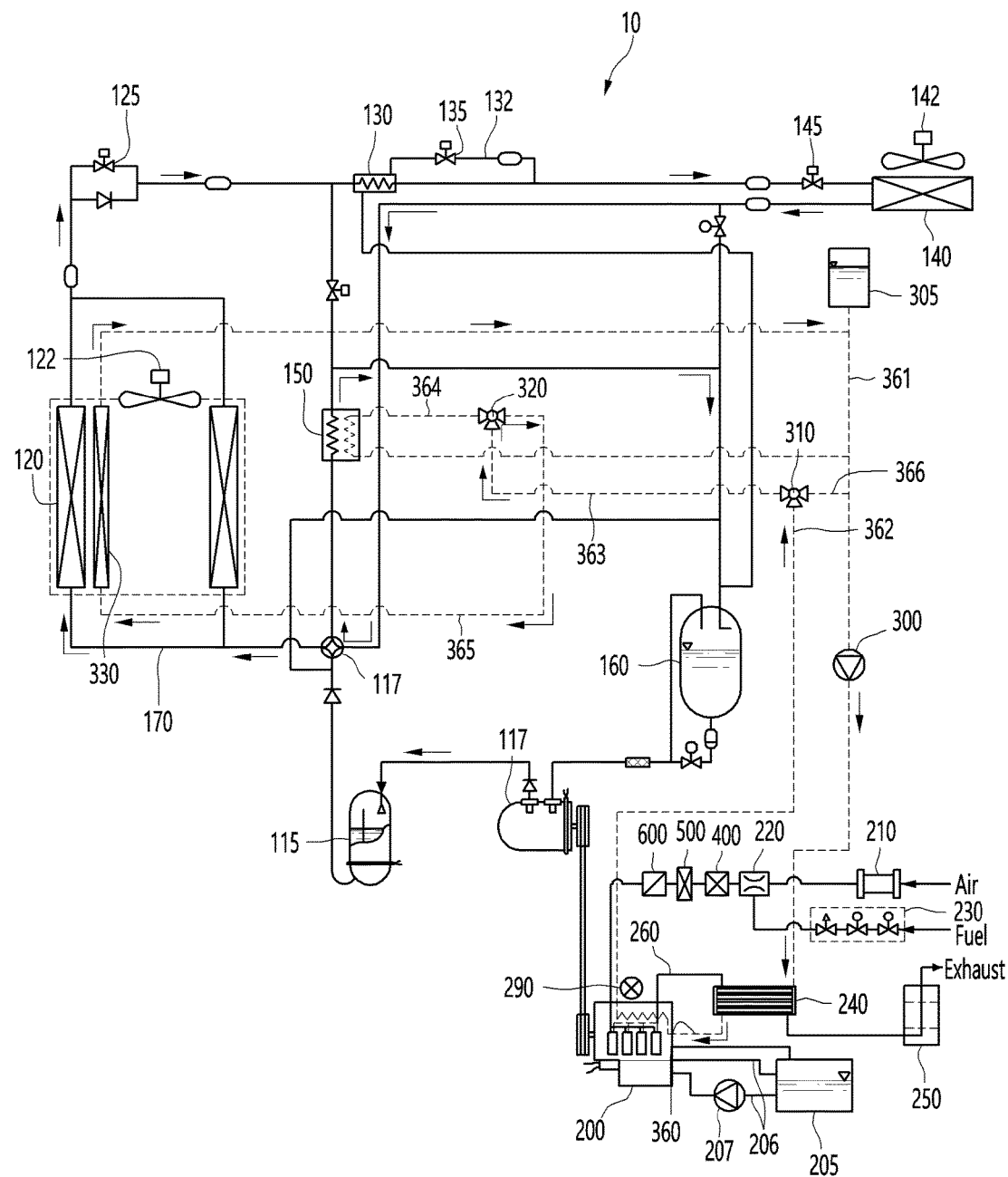

[Fig. 4]
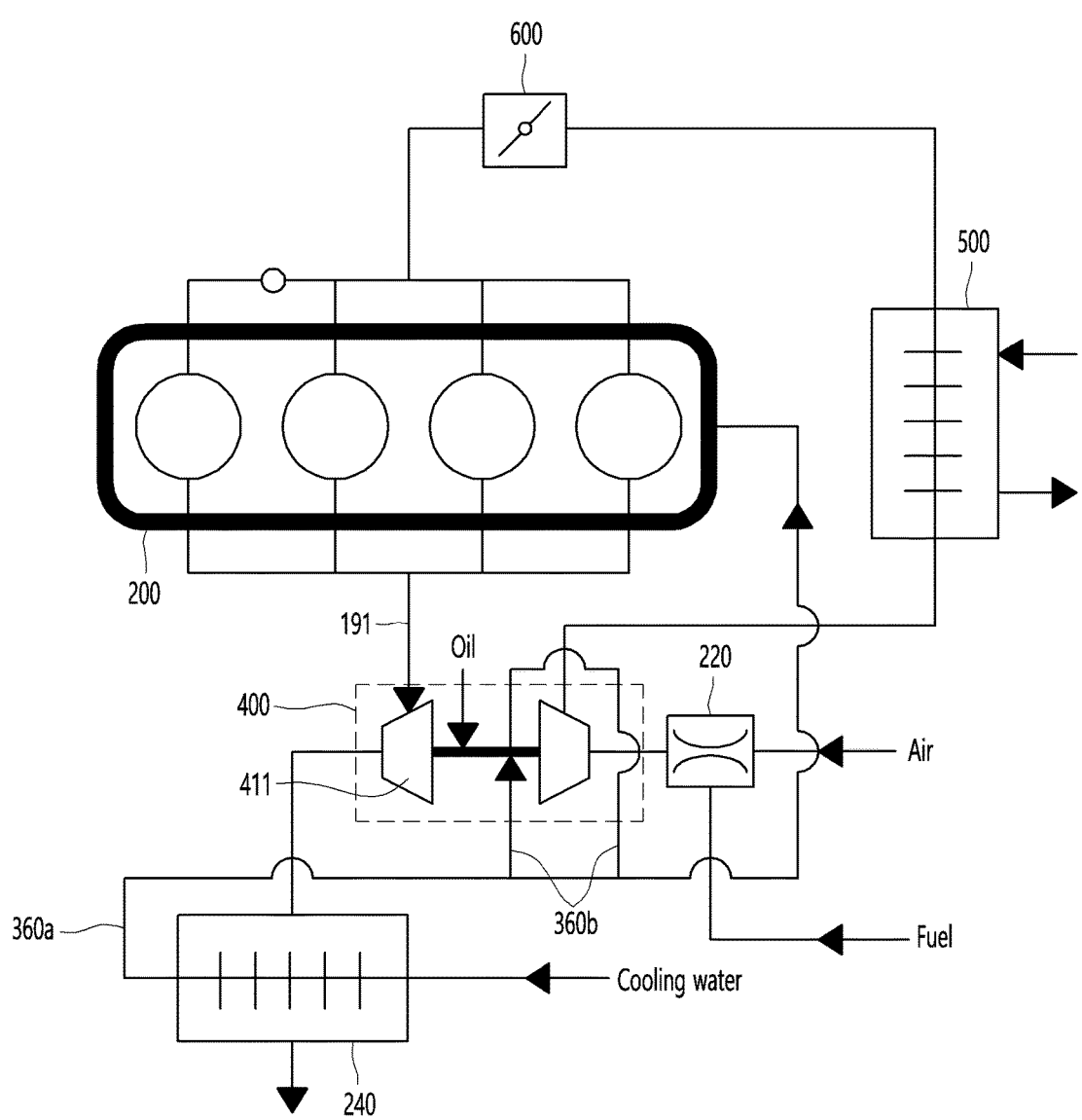

【Fig. 5】
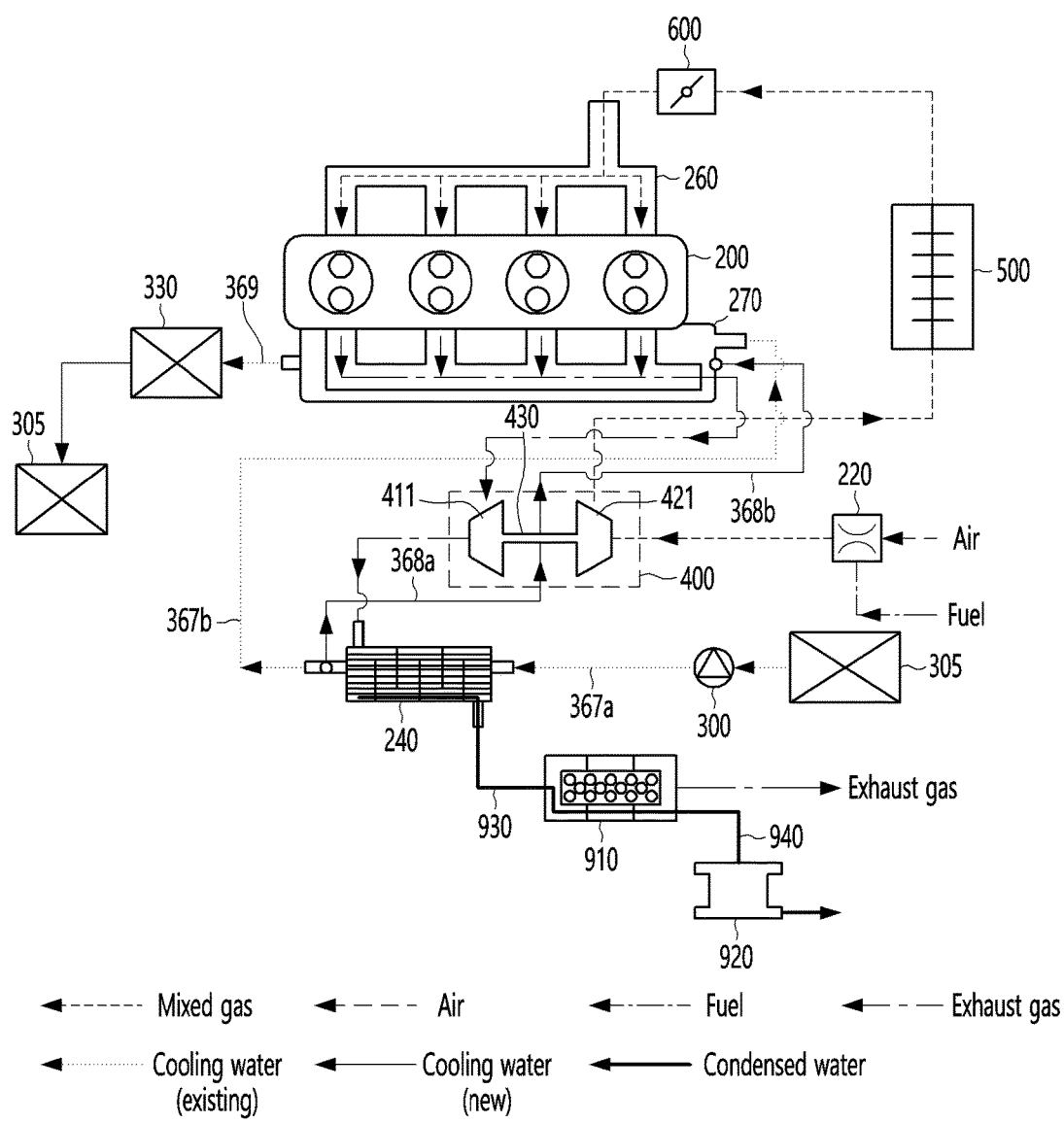

[Fig. 6]
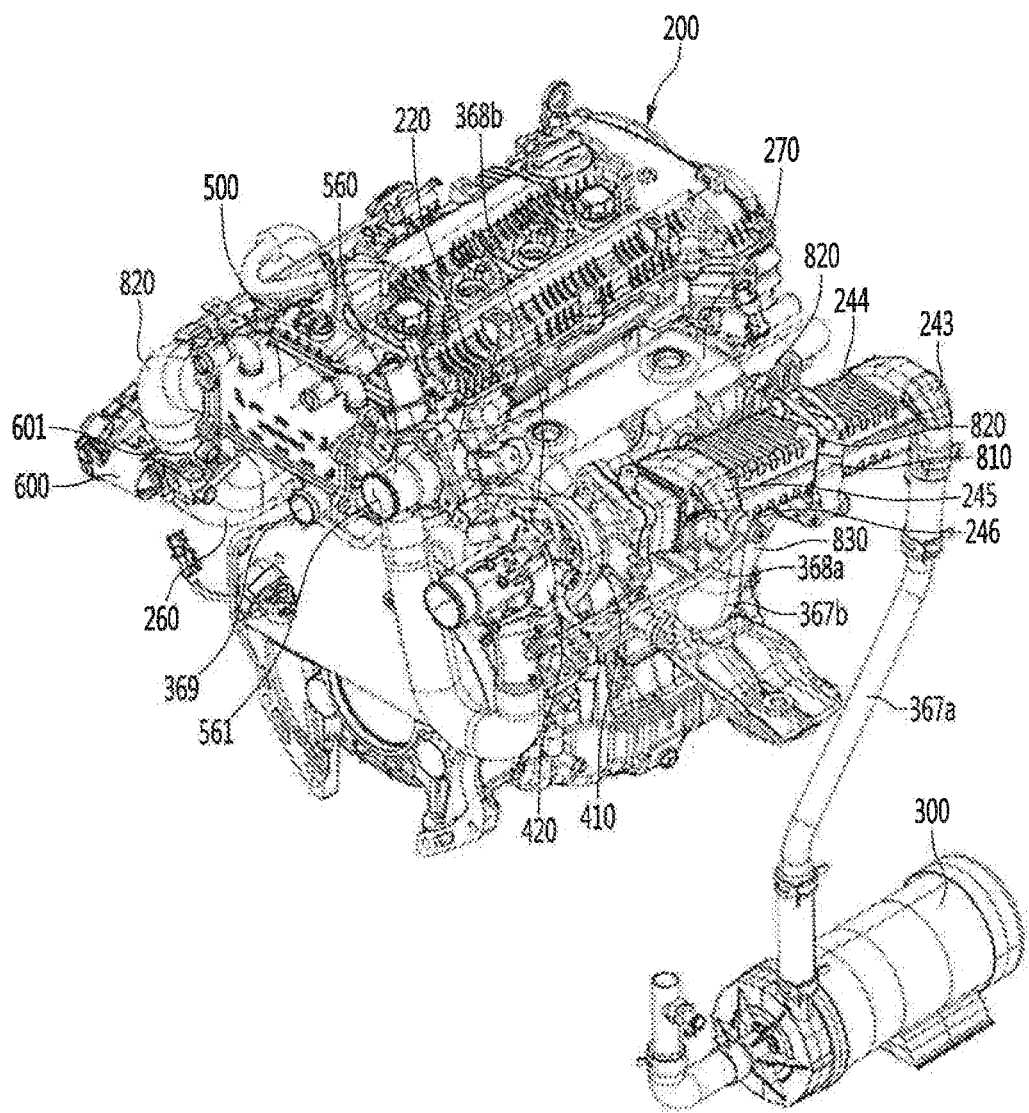

[Fig. 7]
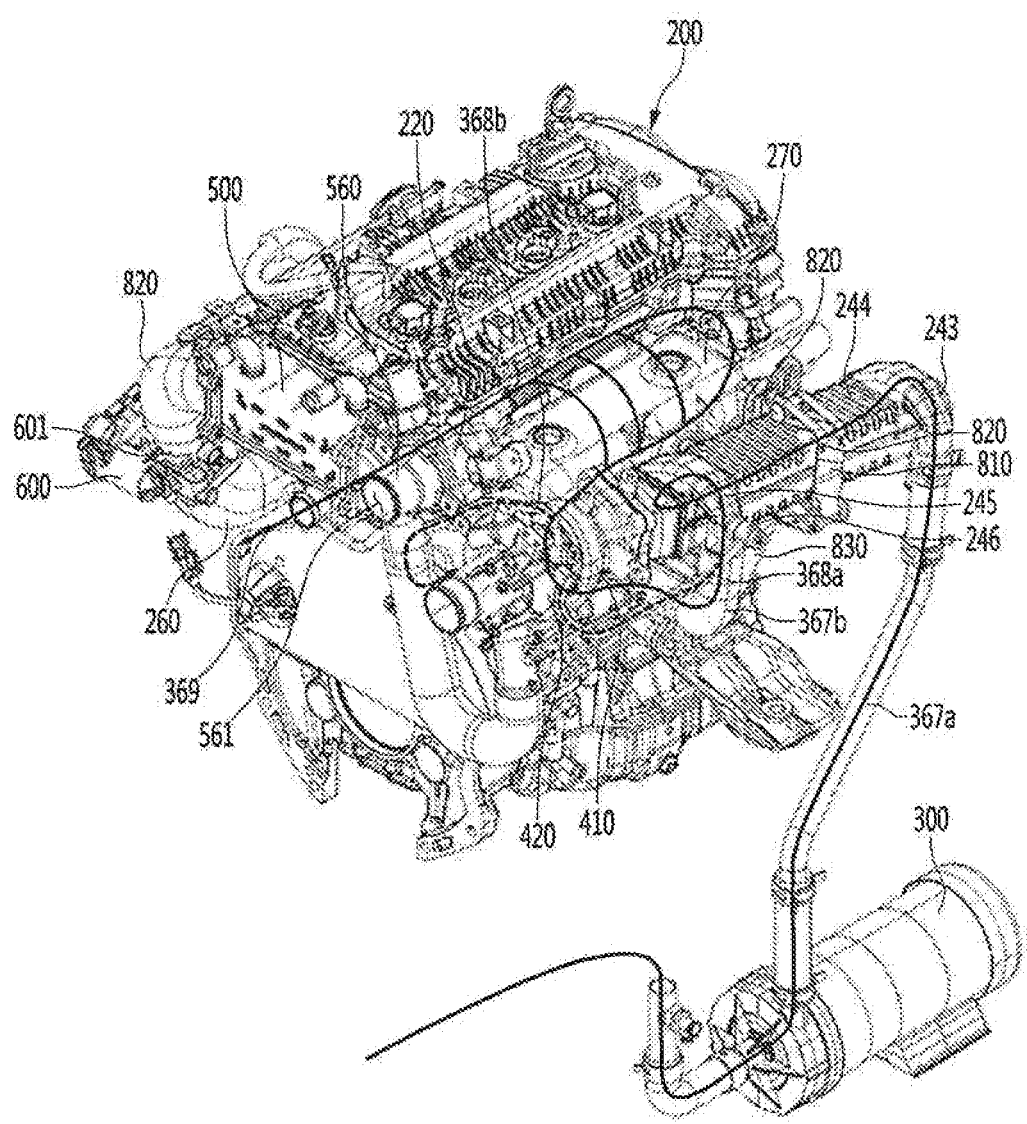

[Fig. 8]
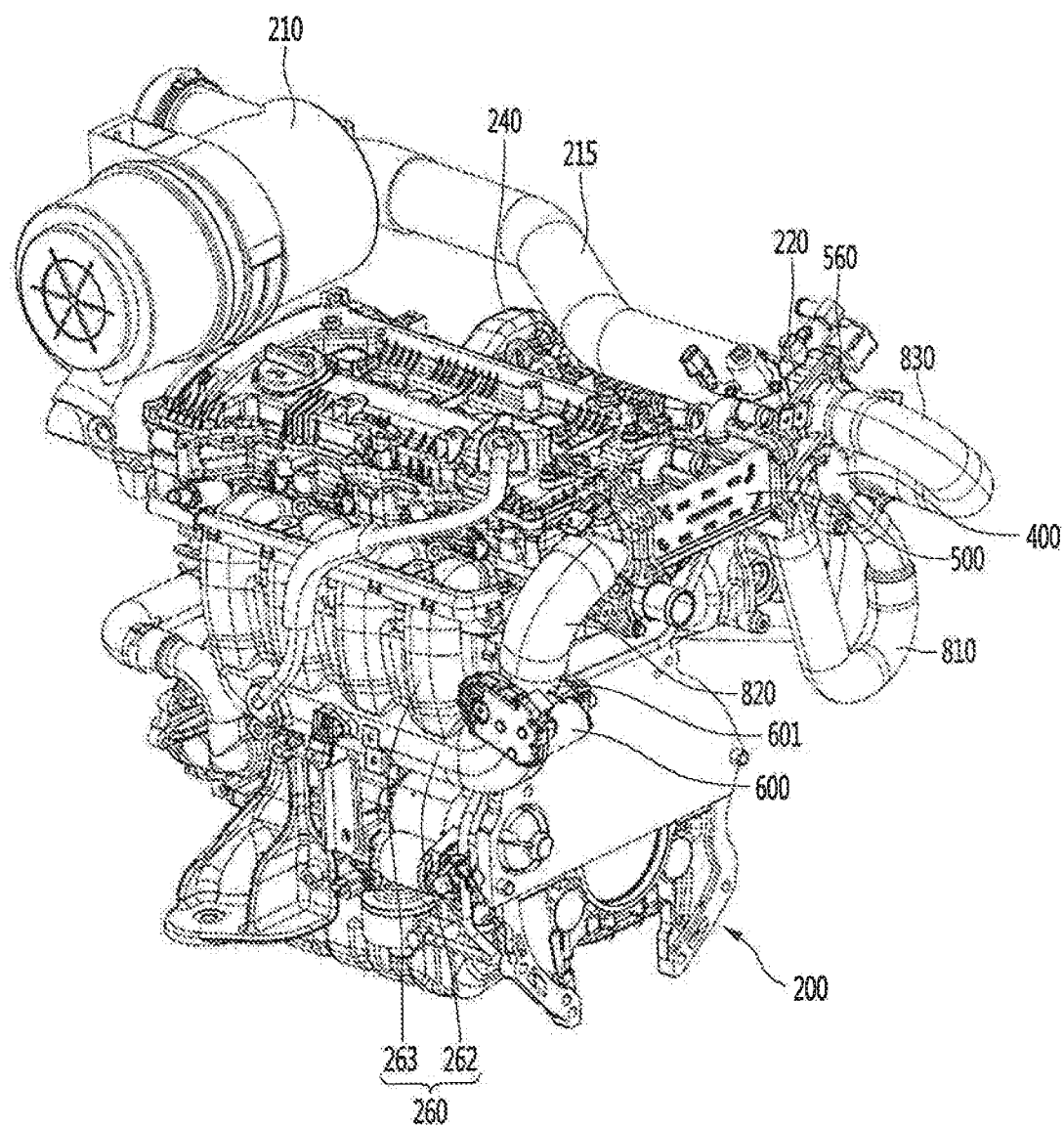

[Fig. 9]
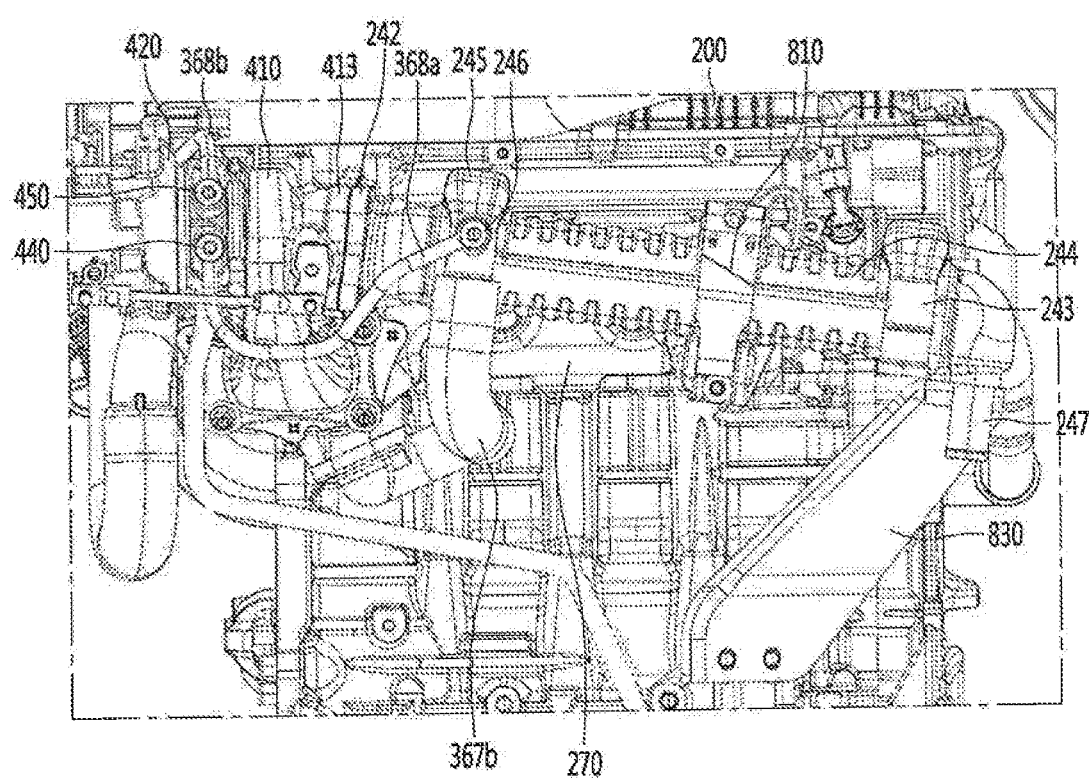

【Fig. 10】
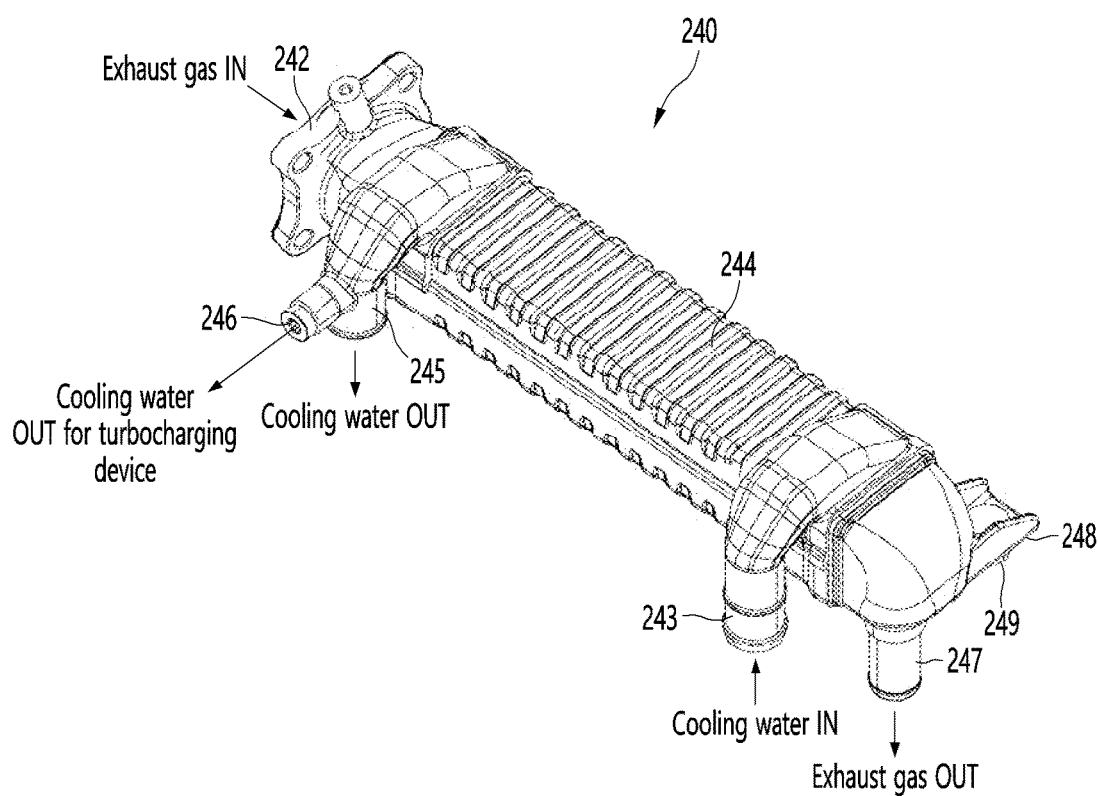

[Fig. 11]
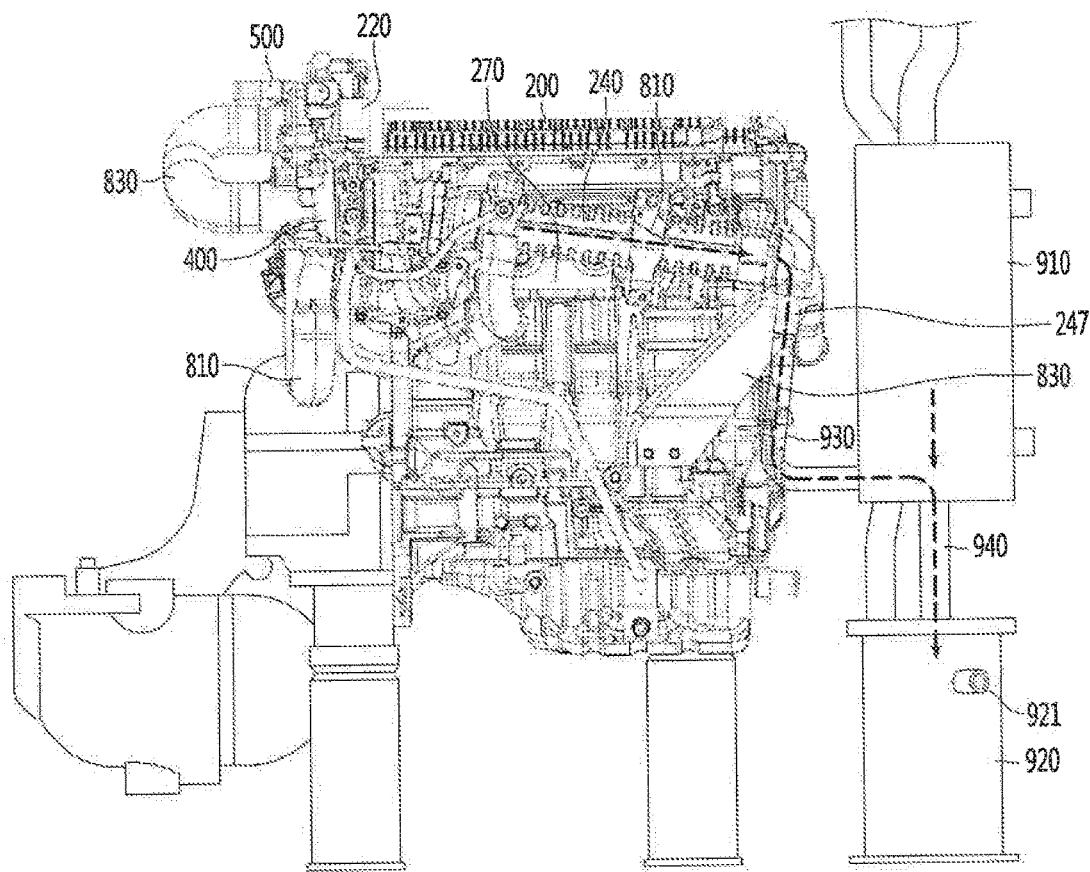

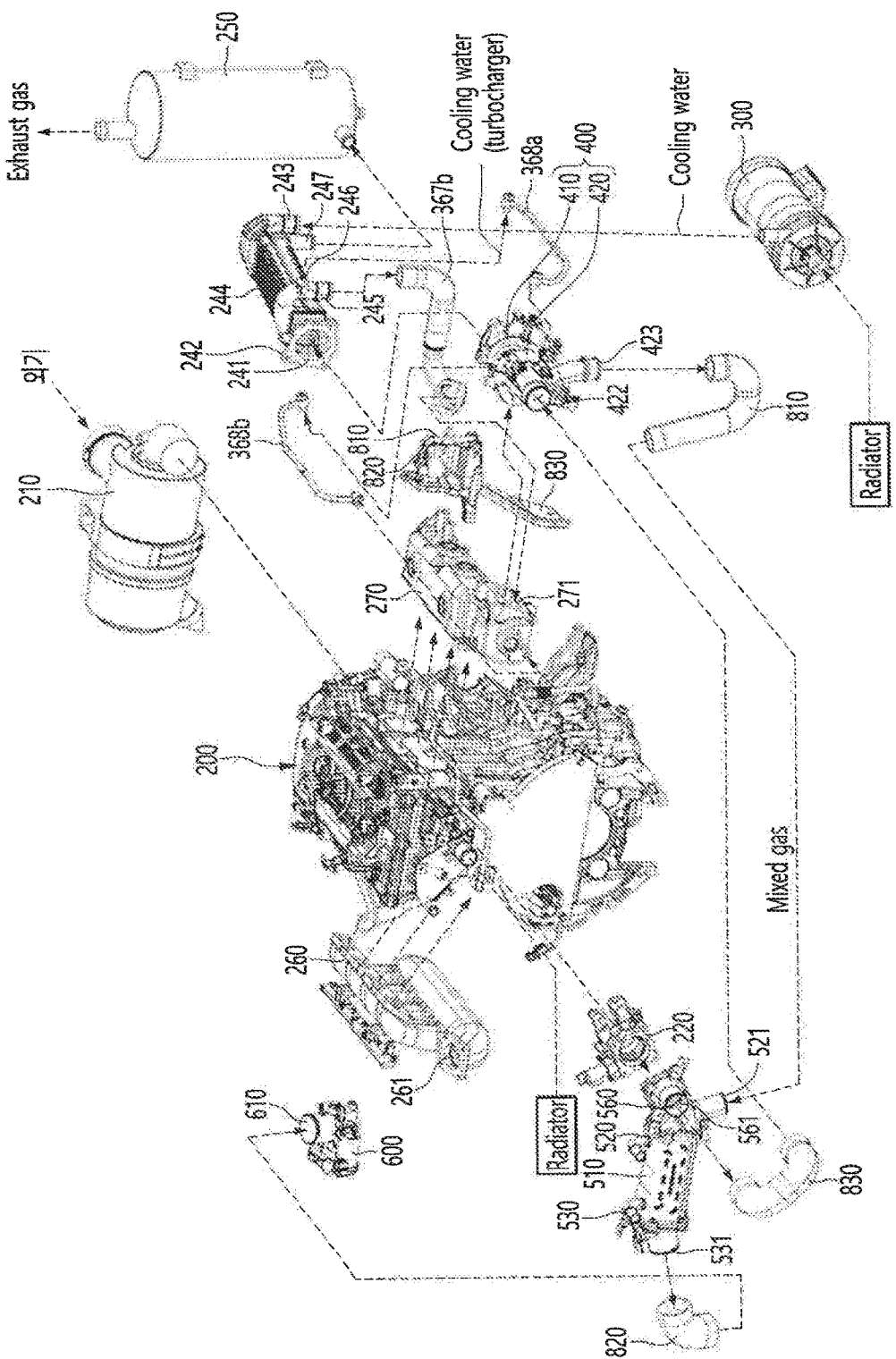
[Fig. 12]

[Fig. 13]
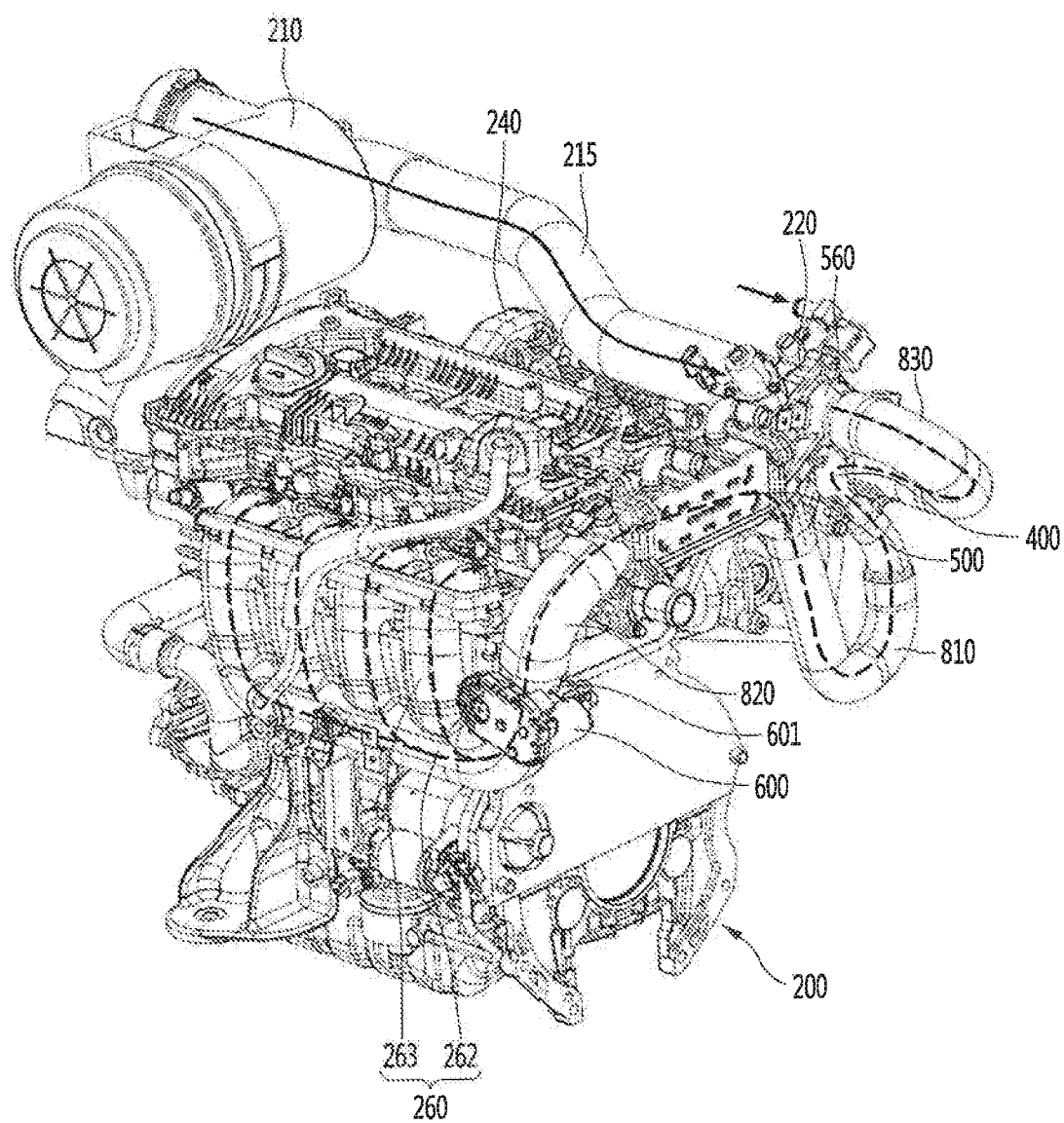

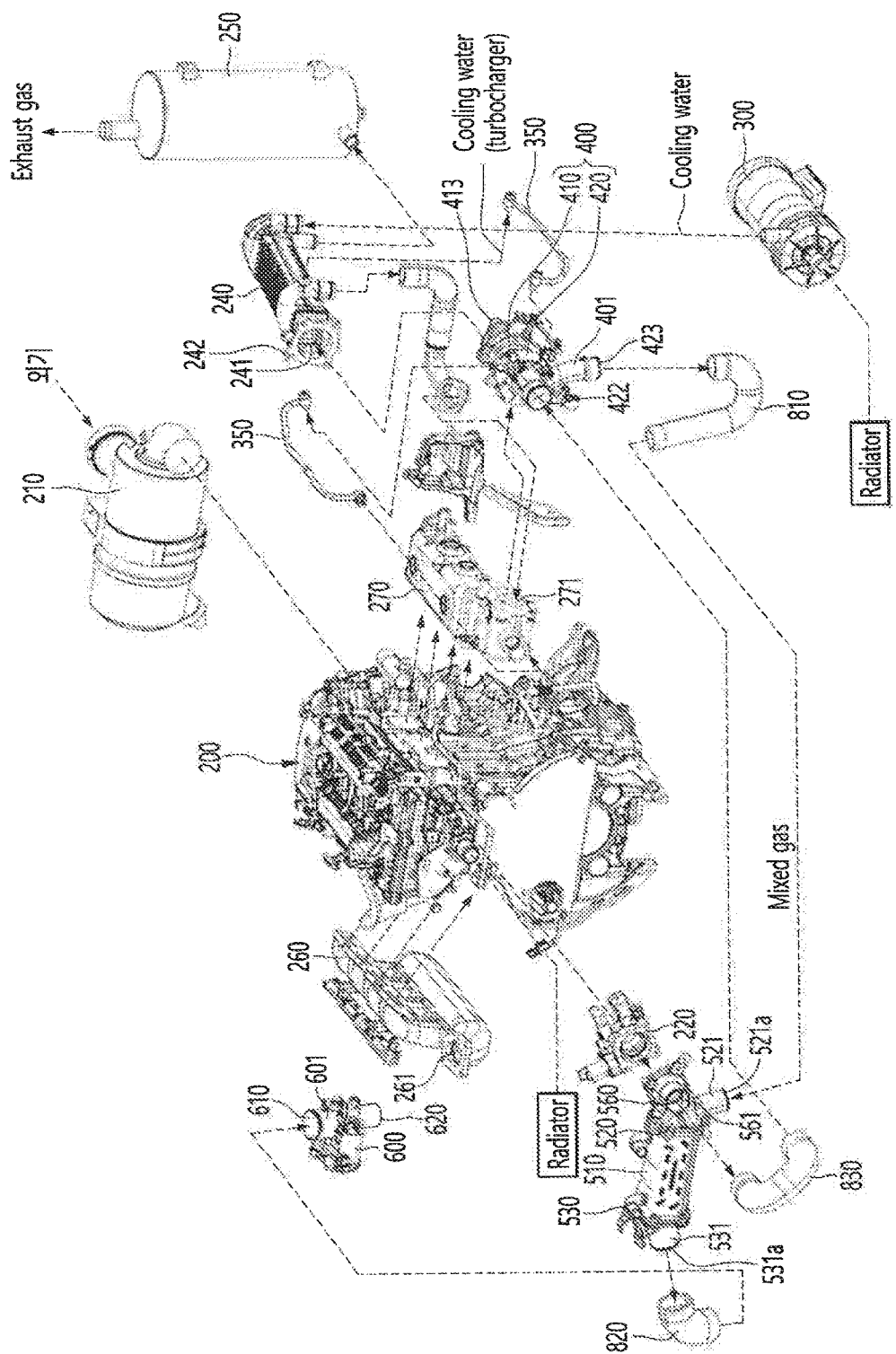
[Fig. 14]

[Fig. 15A]
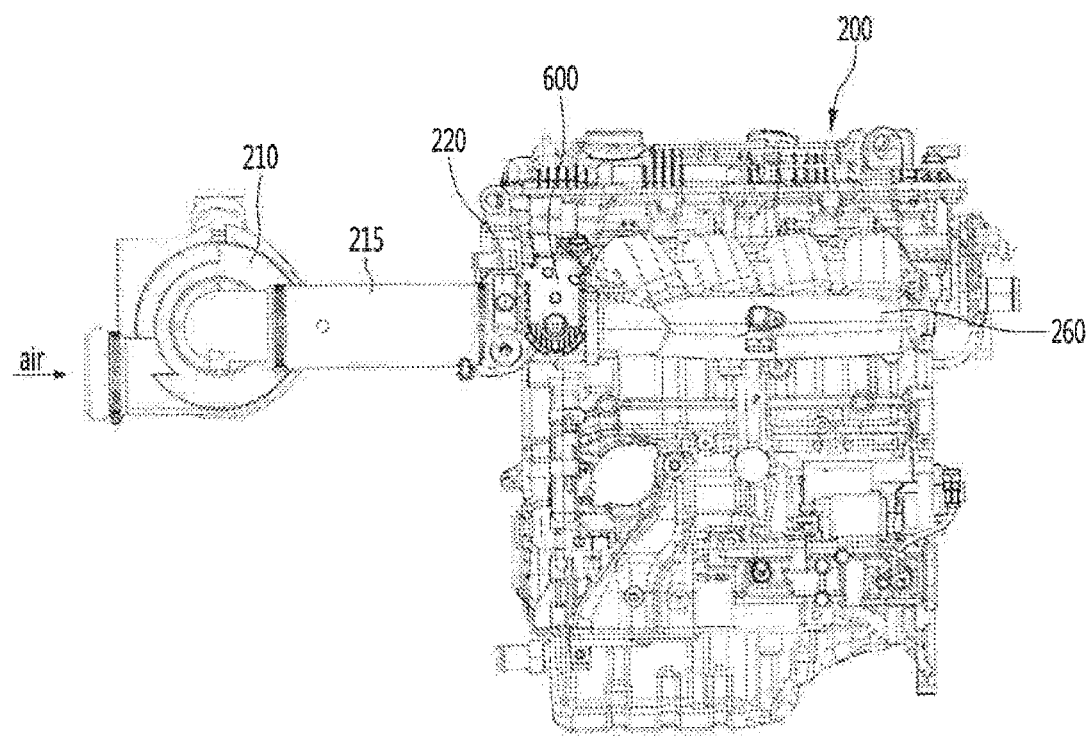
[Fig. 15B]
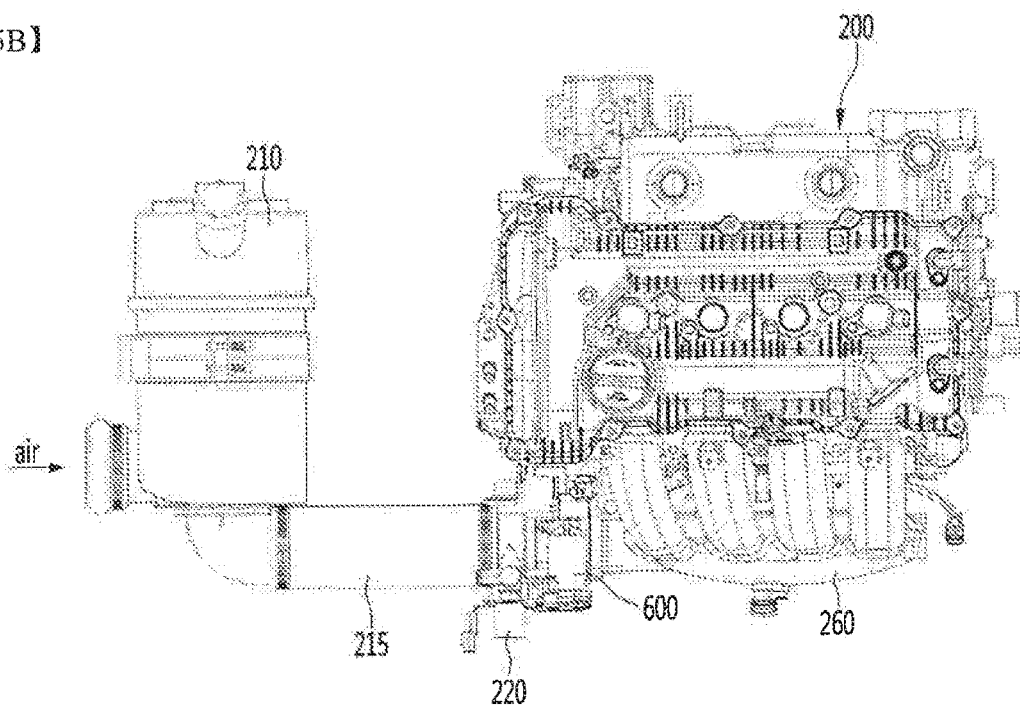

[Fig. 16A]
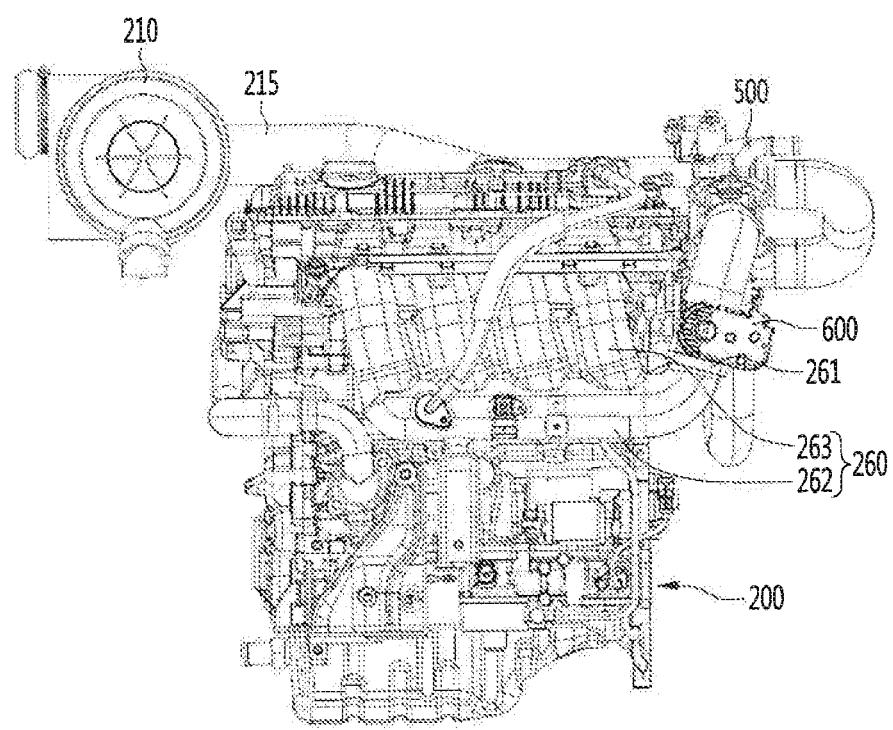
[Fig. 16B]
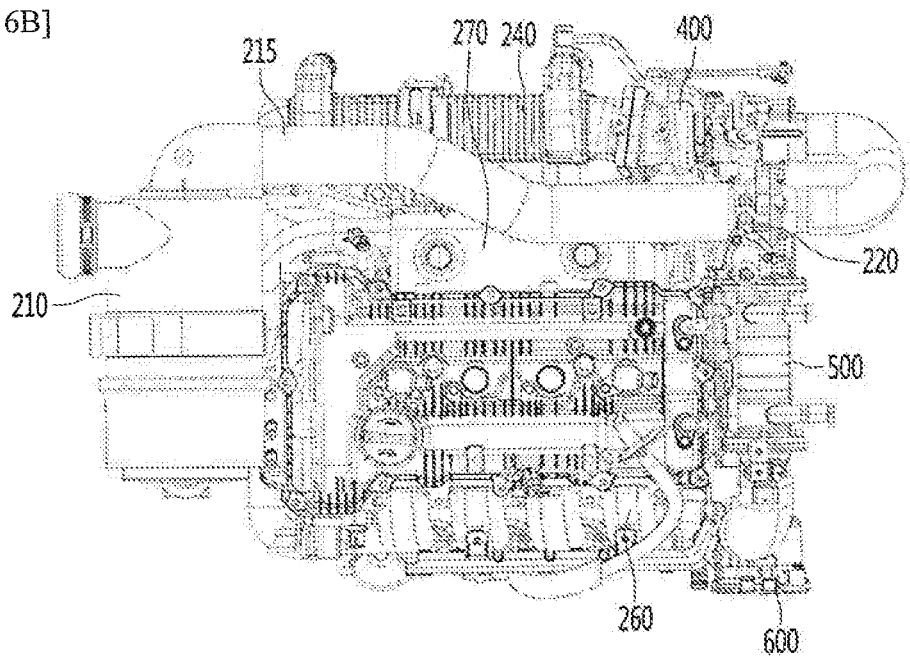

[Fig. 17]
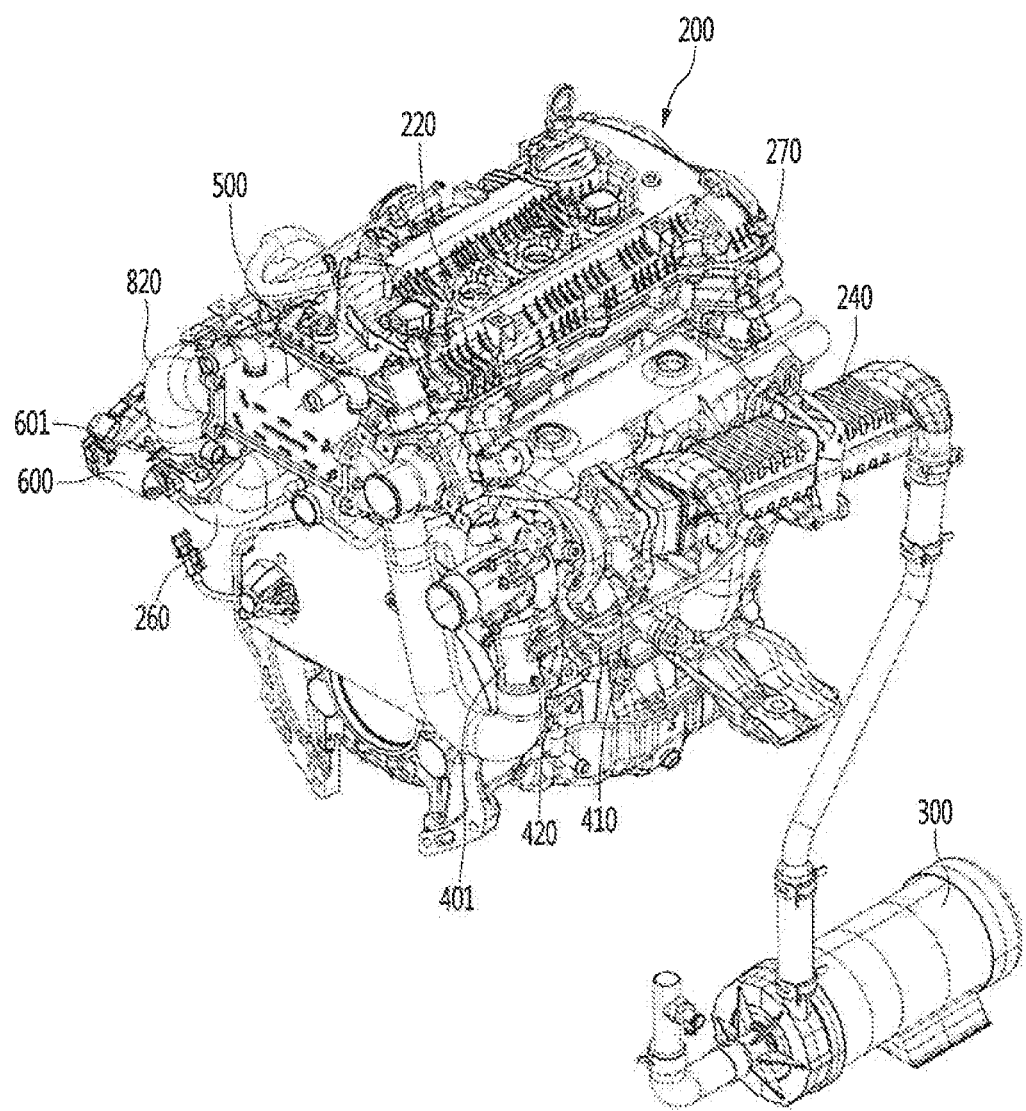

GAS HEAT PUMP SYSTEM

CROSS-REFERENCE TO RELATED PATENT APPLICATIONS

This application is a U.S. National Stage Application under 35 U.S.C. § 371 of PCT Application No. PCT/KR2018/015797, filed Dec. 12, 2018, which claims priority to Korean Patent Application No. 10-2017-0170193, filed Dec. 12, 2017, whose entire disclosures are hereby incorporated by reference.

TECHNICAL FIELD

The present invention relates to a gas heat pump system.

BACKGROUND ART

A heat pump system may be a system having a refrigeration cycle in which cooling or heating operations are performed and be interlocked with a hot water supply device and a cooling/heating device. That is, hot water may be produced, or air-conditioning for the cooling and heating operations may be performed using a heat source obtained by heat-exchange between a refrigerant of the refrigeration cycle and a predetermined heat storage medium.

For the refrigerant cycle, a condenser that compresses the refrigerant, a condenser that condenses the refrigerant compressed in the compressor, an expansion device that depressurizes the refrigerant condensed in the condenser, and an evaporator that evaporates the depressurized refrigerant are provided.

The heat pump system includes a gas heat pump system. A high-capacity compressor, which is not intended for domestic use but for industries or for air-conditioning large buildings is required. That is, the gas heat pump system may be used as a system using a gas engine, instead of an electric motor so as to drive the compressor for compressing a large amount of refrigerant into a high-temperature high-pressure gas.

The gas heat pump system includes an engine that generates power using a mixture (hereinafter, referred to as a mixed gas) of fuel and air. For example, the engine may include a cylinder to which the mixed gas is supplied and a piston which is provided to be movable in the cylinder.

The gas heat pump system includes an air supply device that supplies the mixed gas to the engine, a fuel supply device, and a mixer that mixes the air with the fuel.

The air supply device may include an air filter that purifies the air. Also, the fuel supply device may include a zero governor for suppling the fuel having a constant pressure.

The zero governor may be understood as a device that constantly regulates and supplies an outlet pressure regardless of a change of a magnitude or flow rate of an inlet pressure of the fuel. For example, the zero governor may include a nozzle portion that reduces the pressure of the fuel, a diaphragm on which the pressure depressurized at the nozzle portion acts, and a valve device that is opened and closed by an operation of the diaphragm.

The air passing through an air filter and the fuel discharged from the zero governor are mixed in the mixer so as to be supplied to the engine.

Also, when the mixed gas supplied to the engine is burned, an exhaust gas may be discharged from the engine. The gas heat pump system further includes a muffler that reduces noise generated from the exhaust gas.

A prior art document with respect to the gas heat pump system according to the related art is as follows.

1. Registration Number (Filing data): 10-1341533 (Dec. 9, 2013)

2. Title of The Invention: Gas heat pump System And Method For Controlling The Same The gas heat pump according to the related art as described above uses a gas engine that uses the household LNG or LPG as a heat source to circulate a compressor refrigerant and thus operates in a cooling mode in summer and a heating mode in winter.

However, when supplying air to the gas engine in a natural intake manner, and supplying the household LNG or LPG as a fuel, there is a problem in that an output of the gas engine is reduced due to a low supply pressure (1 kPa to 2.5 kPa).

Also, in the summer, the gas heat pump system operates in a cooling mode in order to lower a temperature in the room. When the outdoor temperature is high, hot air is supplied to the gas engine due to the high temperature.

Accordingly, low-density air is supplied to the gas engine to reduce the output of the gas engine. As a result, the output of the gas engine may not be maintained with a high cooling load, which causes cooling failure.

Also, to solve this problem, like an engine of a vehicle, after pressurizing air by using a turbocharger, when supplying the fuel while adjusting an amount of fuel according to the air amount, a supply pressure (about 2.5 kPa) of the gas fuel within tube is less than a supercharging pressure (about 30 kPa), and thus, there is also a problem in that it is difficult to supply the fuel.

When additional components such as a mixer, a turbocharging device, an intercooler, a regulator, and the like are additionally provided to compress and supply the mixed gas of the fuel and the air to the engine, if each component is fixed to a structure that is separated from the engine, a tube has to be connected from an intake manifold of the engine up to an exhaust manifold of the engine. Thus, there is a problem in that the overall length of the tube is longer.

Also, as the length of the tube is longer, the structure is complicated, and as the coupling member for fixing each component is separately provided, the structure is more complicated, and a surface area occupied by each component increases to increase in volume and weight of the entire system.

Also, if the components such as the mixer, the turbocharging device, the intercooler, and the regulator are fixed to the structure that is separated from the engine, when the engine starts, the engine and each component do not vibrate in the same direction, but vibrate in a relatively opposite direction. Thus, there is a problem such as damage of a connection tube and a connected portion of the tube due to the vibration of the engine.

Also, when the mixed gas of the fuel and air increases in flow length, there is a problem that a risk of explosion increases.

Also, a gas engine heat pump system is provided with an exhaust gas heat exchanger to collect heat generated by the engine.

The existing exhaust gas heat exchanger has the form of a shell-tube type and is attached directly to the exhaust manifold.

However, when a turbocharger is applied to the gas engine heat pump system, an exhaust gas passes through the exhaust manifold to reach the turbocharger, thereby affecting turbine driving and adversely affecting engine efficiency due to an exhaust pressure difference generated during the turbine driving. Thus, it is difficult to sufficiently secure an amount of heat to be collected from the existing shell-tube type exhaust gas heat exchanger.

Also, when heat exchange occurs inside the exhaust gas heat exchanger, condensed water is generated at a gas line side to cause corrosion of the internal structure, thereby damaging the internal structure.

In addition, when the components such as the mixer, the turbocharging device, the intercooler, and the regulator are additionally provided to compress and supply the mixed gas of the fuel and the air to the engine, a flow path of the mixed gas of the air and the fuel is complicated, unlike the related art, and thus, flow resistance of the mixed gas inevitably increases. Therefore, it is necessary to change the shape and arranged structure of the intake manifold and the regulator so that the flow resistance of the mixed gas is minimized.

DISCLOSURE OF THE INVENTION

Technical Problem

The present invention has been proposed to solve these problems, an object of the present invention is to provide a gas heat pump system capable of improving performance of an engine by supercharging a mixed gas supplied to an engine.

In addition, an object of the present invention is to provide a gas heat pump system capable of improving maximum power of an engine without increasing in size of an engine.

In addition, an object of the present invention is to provide a gas heat pump system in which an intercooler is mounted to decrease in temperature of a mixed gas supplied to an engine and increase in density, thereby improving volume efficiency of the engine.

In addition, an object of the present invention is to provide a gas heat pump system in which discharge of condensed water naturally occurs in an exhaust gas heat exchanger to prevent a phenomenon in which the exhaust gas heat exchanger corrodes or is damaged by the condensed water from occurring.

In addition, an object of the present invention is to provide a gas heat pump system in which a separate structure for discharging condensed water is not added to simplify a structure, reduce manufacturing costs, and increase in productivity.

In addition, an object of the present invention is to provide a gas heat pump system in which both ends and a central portion of an exhaust gas heat exchanger are fixed to an engine to secure fixing force of the exhaust gas heat exchanger, thereby reducing vibration applied to the exhaust gas heat exchanger due to an effect of the engine.

In addition, an object of the present invention to provide a gas heat pump system in which an exhaust gas heat exchanger vibrates in the same direction as an engine when the engine vibrates to prevent a relative motion in which the engine and the exhaust gas heat exchanger vibrate in opposite directions from occurring.

In addition, an object of the present invention is to provide a gas heat pump system in which a turbocharger and an exhaust gas heat exchanger are directly connected to each other so that it is advantageous in reducing exhaust differential pressure, and a separate structure for connection is omitted.

In addition, an object of the present invention is to provide a gas heat pump system in which an exhaust gas heat exchanger is disposed close to an exhaust manifold while newly mounting a fixing portion on a central portion of the exhaust gas heat exchanger to minimize an effect of vibration generated in an engine, which is applied to the exhaust gas heat exchanger.

In addition, an object of the present invention is to provide a gas heat pump system in which components such as a turbocharging device, an intercooler, a regulator, and the like are fixed to an engine itself rather than a separate structure that is separated from the engine to omit a structure for fixing each of the components.

In addition, an object of the present invention is to provide a gas heat pump system in which each of components is fixed to an engine to reduce distances between a regulator and an intake manifold, between a turbocharging device and an exhaust manifold, and between an intercooler and the turbocharging device to reduce a length of an entire tube, thereby reducing a surface area occupied by the tube.

In addition, an object of the present invention is to provide a gas heat pump system in which components such as a turbocharging device, an intercooler, a regulator, and the like are fixed to an engine to prevent a relative movement phenomenon in which the turbocharging device, the intercooler, the regulator, and the like move in opposite directions from occurring when the engine is driven, so as to reduce vibration applied to a tube and a connected portion and prevent a phenomena in which the tube and various connected portions are loose or damaged by the vibration, thereby improving durability and preventing safety accidents.

In addition, an object of the present invention is to provide a gas heat pump system in which a turbocharging device is directly connected to an exhaust manifold to maximally collect energy of an exhaust gas from a turbine, and a regulator is directly connected to an intake manifold to more precisely regulate an amount of mixed gas to be supplied.

In addition, an object of the present invention is to provide a gas heat pump system in which a tube connecting an air filter to a mixer is provided in a straight line to minimize intake resistance of air.

In addition, an object of the present invention is to provide a gas heat pump system in which an oil supply line is newly installed so that a portion of an oil used in an engine passes through a rotation shaft of a turbocharger so that supply of the oil to the turbocharger is performed without a separate oil supply device, and the oil passing through the turbocharger passes through an engine oil cooler to prevent the oil supplied to the turbocharger from increasing in temperature, thereby preventing carbonization of the oil and damage of the turbocharger from occurring.

In addition, an object of the present invention is to provide a gas heat pump system in which an engine is driven until the engine stops in a state in which blocking an inflow of a mixed gas to burn a remaining mixed gas or discharge the remaining mixed gas to the outside, thereby suppressing an occurrence of formic acid and preventing safety accidents such as corrosion and explosion of the components from occurring.

In addition, an object of the present invention is to provide a gas heat pump system in which an outlet of a regulator and an intake manifold are directly connected to fix the regulator to the intake manifold, thereby reducing intake resistance while realizing a compact structure.

Technical Solution

A gas heat pump system according to an embodiment of the present invention includes: an air-conditioning module comprising a compressor, an outdoor heat exchanger, an expansion device, an indoor heat exchanger, and a refrigerant tube; and an engine module comprising an engine in which a mixed gas of a fuel and air is burned to provide power for an operation of the compressor, wherein the engine module includes: a mixer in which the air and the fuel are mixed to be discharged; a turbocharging device configured to receive the mixed gas discharged from the mixer so as to compress and discharge the mixed gas; an intercooler configured to receive the mixed gas compressed in the turbocharging device so as to cool the mixed gas in a heat-exchange manner to increase in density, thereby discharging the mixed gas; a regulator configured to receive the mixed gas discharged from the intercooler so as to control an amount of mixed gas and supply the mixed gas to the engine; and an exhaust gas heat exchanger configured to heat-exchange an exhaust gas discharged from the engine with cooling water.

Also, the exhaust gas heat exchanger may have one side, through which the exhaust gas is introduced, and the other side through which the exhaust gas is discharged and which is lower than the one side so that the one side is disposed to be inclined downward to the other side.

Also, the turbocharging device may be provided as a turbocharger that is driven by the exhaust gas of the engine, and the exhaust gas heat exchanger may be configured to receive the exhaust gas passing through the turbocharging device so as to be heat-exchanged with the cooling water.

Also, a discharge hole of the turbocharging device and a suction hole of the heat exchanger may be directly connected to each other.

Also, each of the discharge hole of the turbocharging device and the suction hole of the heat exchanger may be provided with a flange protruding along a circumference thereof, and in a state in which the flanges contact each other, the flanges may be coupled to be connected to each other by using a coupling portion.

Also, the exhaust gas heat exchanger may be directly fixed to the engine.

The engine module may further include a grip portion having one side coupled to the exhaust gas heat exchanger in a manner of gripping the exhaust gas heat exchanger and the other side fixed to the engine.

Also, the other side of the exhaust gas heat exchanger, through which the exhaust gas is discharged, may be fixed to the engine by a separate support frame.

Also, an exhaust gas discharge tube provided to face a lower side, an extension portion extending in a direction crossing the exhaust gas discharge tube, and a protrusion protruding downward from a bottom surface of the extension portion may be disposed at the other side of the exhaust gas heat exchanger, and an upper end of the support frame may be disposed parallel to the extension portion so as to be coupled to the protrusion at a lower side of the extension portion.

Also, the exhaust gas heat exchanger may include: a cooling water inflow tube which is provided at the other side through which the exhaust gas is discharged and into which the cooling water is introduced; a heat exchanging chamber in which the introduced cooling water and the exhaust gas are heat-exchanged with each other; and a cooling water discharge tube which is provided at one side through which the exhaust gas is introduced and from which the cooling water heat-exchanged with the exhaust gas is discharged.

Also, the engine module may be provided with a cooling water pump and a cooling water tube, through which the cooling water flows to the exhaust gas heat exchanger or the turbocharging device.

Also, the cooling water tube may include: a first main tube configured to connect the cooling water pump to the cooling water inflow tube of the exhaust gas heat exchanger; and a second main tube configured to connect the cooling water discharge tube of the exhaust gas heat exchanger to an exhaust manifold of the engine.

Also, a branch hole through which the cooling water is supplied toward the turbocharging device may be defined in the cooling water discharge tube of the exhaust gas heat exchanger.

Also, the cooling water tube may include: a first branch tube configured to the branch hole to the turbocharging device; and a second branch tube configured to the turbocharging device to an exhaust manifold of the engine.

The cooling water tube may include a third main tube configured to guide the cooling water passing through the exhaust manifold of the engine to a radiator.

Also, the exhaust gas passing through the exhaust gas heat exchanger may flow to a silencer through an exhaust tube.

Also, condensed water generated in the exhaust gas heat exchanger may flow along the exhaust tube and is discharged to the outside.

Also, the condensed water flowing to the exhaust tube may be discharged to the outside through a condensed water discharge hole defined in a drain filter.

Also, the gas heat pump system may further include an intake manifold into which the mixed gas supplied from the regulator is introduced, wherein a first mixed gas inflow hole of the intake manifold and a first mixed gas discharge hole of the regulator may be directly connected to each other.

Also, the turbocharging device may be provided adjacent to an exhaust manifold disposed on a first surface of the engine, the regulator may be provided adjacent to the intake manifold disposed on a second surface opposite to the first surface, and the intercooler may be fixed to a third surface crossing the first surface and the second surface.

Also, the intercooler may be disposed above the turbocharging device or the regulator.

Also, the intercooler may be provided with a discharge tube having a downwardly inclined shape so that the mixed gas is discharged toward the intake manifold.

Also, a connection tube having a bent shape and configured to guide a flow of the mixed gas downward from an upper side may be provided between the discharge tube and the second mixed gas inflow hole of the regulator.

Also, the mixed gas discharge hole of the regulator may be disposed to face a lower side, and the mixed gas inflow hole of the intake manifold may be disposed to face an upper side.

Also, the intake manifold may include: a main portion configured to guide the mixed gas, which is introduced downward through the mixed gas inflow hole, in a horizontal direction; and a plurality of branch portions, each of which communicates with the main portion, the plurality of branch portions being configured to guide the mixed gas, which is guided in the horizontal direction, upward in a vertical direction so as to supply the mixed gas to the engine.

Also, the intake manifold may be disposed to be erected parallel to the second surface of the engine.

Also, the engine module may further include an air filter configured to purify external air, and at least a portion of an air tube configured to connect the air filter to the mixer may have a straight-line shape.

Also, the air filter and the mixer may be fixed at the same height.

Advantageous Effects

According to the present invention, there is an advantage that the volume efficiency is improved by supplying the mixed gas of the fuel and the air, which is supplied to the gas engine to the engine, at a higher pressure than natural intake using the turbocharging device.

There is also an advantage that the engine and the entire system may be downsized.

In addition, there is an advantage that it is possible to implement the large-capacity gas engine heat pump system using the small gas engine.

In addition, there is an advantage that the engine output increases in gas engine heat pump (GHP) using the gas fuel for the home.

In addition, there is an advantage that the volume efficiency of the engine is improved by decreasing in temperature of the mixer supplied to the engine and increasing in density.

In addition, in the exhaust gas heat exchanger, the condensed water discharge may naturally occur to prevent the phenomenon in which the exhaust gas heat exchanger corrodes or is damaged by the condensed water from occurring.

In addition, the separate structure for discharging the condensed water may not be added to simplify a structure, reduce manufacturing costs, and increase in productivity.

In addition, both the ends and the central portion of the exhaust gas heat exchanger may be fixed to the engine to secure the fixing force of the exhaust gas heat exchanger, thereby reducing the vibration applied to the exhaust gas heat exchanger due to the effect of the engine.

In addition, the exhaust gas heat exchanger may vibrate in the same direction as the engine when the engine vibrates to prevent the relative movement in which the engine and the exhaust gas heat exchanger vibrate in opposite directions from occurring.

In addition, the turbocharger and the exhaust gas heat exchanger may be directly connected to each other so that it is advantageous in reducing the exhaust differential pressure, and the separate structure for connection is omitted.

In addition, the exhaust gas heat exchanger may be disposed close to the exhaust manifold while newly mounting the fixing portion on the central portion of the exhaust gas heat exchanger to minimize the effect of the vibration generated in the engine, which is applied to the exhaust gas heat exchanger.

In addition, the components such as the turbocharging device, the intercooler, the regulator, and the like may be fixed to the engine itself rather than the separate structure that is separated from the engine to omit the structure for fixing each of the components.

In addition, each of the components may be fixed to the engine to reduce the distances between the regulator and the intake manifold, between the turbocharging device and the exhaust manifold, and between the intercooler and the turbocharging device and thus reduce the length of the entire tube, thereby reducing the surface area occupied by the tube.

In addition, the components such as the turbocharging device, the intercooler, the regulator, and the like are fixed to the engine to prevent the relative movement phenomenon in which the turbocharging device, the intercooler, the regulator, and the like move in opposite directions from occurring when the engine is driven, so as to reduce the vibration applied to the tube and the connected portion and prevent the phenomena in which the tube and the various connected portions are loose or damaged by the vibration, thereby improving the durability and preventing the safety accidents.

In addition, the turbocharging device may be directly connected to the exhaust manifold to maximally collect the energy of the exhaust gas from the turbine, and the regulator may be directly connected to the intake manifold to more precisely regulate the amount of mixed gas to be supplied.

In addition, the tube connecting the air filter to the mixer may be provided in the straight line to minimize the intake resistance of the air.

In addition, the oil supply line may be newly installed so that a portion of the oil used in the engine passes through the rotation shaft of the turbocharger so that supply of the oil to the turbocharger is performed without the separate oil supply device, and the oil passing through the turbocharger passes through the engine oil cooler to prevent the oil supplied to the turbocharger from increasing in temperature, thereby preventing the carbonization of the oil and damage of the turbocharger from occurring.

In addition, the engine may be driven until the engine stops in the state in which blocking the inflow of the mixed gas to burn the remaining mixed gas or discharge the remaining mixed gas to the outside, thereby suppressing the occurrence of the formic acid and preventing the safety accidents such as the corrosion and the explosion of the components from occurring.

In addition, the outlet of the regulator and the intake manifold may be directly connected to fix the regulator to the intake manifold, thereby reducing the intake resistance while realizing the compact structure.

BRIEF DESCRIPTION OF THE DRAWINGS

FIG. 1 is a cycle view illustrating a configuration of a gas heat pump system according to a first embodiment of the present invention.

FIG. 2 is a cycle view illustrating a flow of a refrigerant, cooling water, and a mixed fuel during a heating operation of the gas heat pump system.

FIG. 3 is a cycle view illustrating a flow of the refrigerant, the cooling water, and the mixed fuel during a cooling operation of the gas heat pump system.

FIG. 4 is a system view illustrating an example of an engine module that is one of components according to the present invention.

FIG. 5 is a system view of an engine module according to another embodiment of the present invention.

FIG. 6 is a perspective view of the engine module that is one of the components when viewed in a direction of an exhaust manifold according to the present invention.

FIG. 7 is a view illustrating a flow of cooling water in the engine module of FIG. 6.

FIG. 8 is a perspective view of the engine module that is one of the components when viewed in a direction of an intake manifold according to the present invention.

FIG. 9 is a front view illustrating a state in which an exhaust gas heat exchanger is mounted on the engine module.

FIG. 10 is a perspective view of the exhaust gas heat exchanger that is one of the components according to an embodiment.

FIG. 11 is a front view illustrating further another example of the engine module.

FIG. 12 is an exploded perspective view illustrating the engine module that is one of the components according to an embodiment.

FIG. 13 is a view illustrating a flow of air in the engine module of FIG. 8.

FIG. 14 is an exploded perspective view illustrating another example of the engine module that is one of the components according to an embodiment.

FIGS. 15A and 15B are views illustrating a configuration of an engine module having no supercharging function according to a related art.

FIGS. 16A and 16B are views illustrating a configuration of an engine module having a supercharging function according to the present invention.

FIG. 17 is a perspective view of the engine module provided with a cooling water pump.

MODE FOR CARRYING OUT THE INVENTION

Hereinafter, exemplary embodiments will be described with reference to the accompanying drawings. The invention may, however, be embodied in many different forms and should not be construed as being limited to the embodiments set forth herein; rather, that alternate embodiments included in other retrogressive inventions or falling within the spirit and scope of the present disclosure will fully convey the concept of the invention to those skilled in the art.

FIG. 1 is a cycle view illustrating a configuration of a gas heat pump system according to a first embodiment of the present invention.

Referring to FIG. 1, a gas heat pump system 10 according to a first embodiment of the present invention includes a plurality of components, which constitute a refrigerant cycle of an air-conditioning system. In detail, the refrigerant cycle include a compressor 110 that compresses the refrigerant, an oil separator 115 that separates oil form the refrigerant compressed by the compressor 110, and a four-way valve 117 that converts a direction of the refrigerant passing through the oil separator 115.

The gas heat pump system 10 further includes an outdoor heat exchanger 120 and an indoor heat exchanger 140. The outdoor heat exchanger 120 may be provided in an outdoor unit disposed at an outdoor side, and the indoor heat exchanger 140 may be provided in the indoor unit disposed at an indoor side. The refrigerant passing through the four-way valve 117 flows to the outdoor heat exchanger 120 or the indoor heat exchanger 140.

The components of the system illustrated in FIG. 1 may be disposed at the outdoor side, that is, inside the outdoor unit, except for the indoor heat exchanger 140 and an indoor expansion device 145.

In detail, when the system 10 operate in a cooling operation mode, the refrigerant passing through the four-way valve 117 flows toward the indoor heat exchanger 140 via the outdoor heat exchanger 120. On the other hand, when the system 10 operates in a heating operation mode, the refrigerant passing through the four-way valve 117 flows toward the outdoor heat exchanger 120 via the indoor heat exchanger 140.

The system 10 further includes a refrigerant tube 170 (solid line passage) that connects the compressor 110, the outdoor heat exchanger 120, and the indoor heat exchanger 140 to each other to guide a flow of the refrigerant.

A configuration of the system 10 will be described based on the cooling operation mode.

The refrigerant flowing to the outdoor heat exchanger 120 may be condensed by being heat-exchanged with external air. An outdoor fan 122 that blows the external air is provided at one side of the outdoor heat exchanger 120.

A main expansion device 125 that depressurizes the refrigerant may be provided at an outlet-side of the outdoor heat exchanger 120. For example, the main expansion device 125 may include an electronic expansion valve (EEV). When the cooling operation is performed, the main expansion device 125 is fully opened, and thus, the refrigerant is not depressurized.

A supercooling heat exchanger 130, which additionally cools the refrigerant, is provided at an outlet-side of the main expansion device 125. A supercooling passage 132 is connected to the supercooling heat exchanger 130. The supercooling passage 132 is branched from the refrigerant tube 170 and connected to the supercooling heat exchanger 130.

Also, a supercooling expansion device 135 is installed in the supercooling passage 132. The refrigerant flowing through the supercooling passage 132 may be depressurized while passing through the supercooling expansion device 135.

In the supercooling heat exchanger 130, heat exchange may be performed between the refrigerant in the refrigerant tube 170 and the refrigerant in the supercooling passage 132. In the heat exchange process, the refrigerant in the refrigerant tube 170 is supercooled to absorb heat of the refrigerant in the supercooling passage 132.

The supercooling passage 132 is connected to the gas/liquid separator 160. The refrigerant in the supercooling passage 132 heat-exchanged in the supercooling heat exchanger 130 may be introduced into the gas/liquid separator 160.

The refrigerant in the refrigerant tube 170, which passes through the supercooling heat exchanger 130, flows toward the indoor unit and then is depressurized in the indoor expansion device 145 and evaporated in the indoor heat exchanger 140. The indoor expansion device 145 may be installed inside the indoor unit and may be provided as the electronic expansion valve (EEV).

The refrigerant evaporated from the indoor heat exchanger 140 flows to an auxiliary heat exchanger 150 via the four-way valve 117. The auxiliary heat exchanger 150 may be a heat exchanger that is capable of being heat-exchanged between an evaporated low-pressure refrigerant and high-temperature cooling water. For example, the auxiliary heat exchanger 150 may include a plate heat exchanger.

Since the refrigerant evaporated in the indoor heat exchanger 140 may absorb heat while passing through the auxiliary heat exchanger 150 to improve evaporation efficiency. Also, the refrigerant pass through the auxiliary heat exchanger 150 may be introduced into the gas/liquid separator 160.

The refrigerant that passing through the auxiliary heat exchanger 150 is divided into a gas and a liquid in the gas/liquid separator 160, and the separated gas-phase refrigerant may be suctioned into the compressor 110.

In addition, the refrigerant evaporated from the indoor heat exchanger 140 may be introduced into the gas/liquid separator 160 immediately after passing through the four-way valve 117, and the separated gaseous refrigerant is suctioned into the compressor 110.

The gas heat pump system 10 further includes a cooling water tank 305, in which cooling water for cooling the engine 200 is stored, and a cooling water tube 360 (dotted passage) that guides a flow of the cooling water. A cooling water pump 300 that generates flow force of the cooling water, a plurality of flow switching portions 310 and 320 that switch a flow direction of the cooling water, and a radiator 330 that cools the cooling water may be installed in the cooling water tube 36.

The plurality of flow switching portions 310 and 320 include a first flow switching portion 310 and a second flow switching portion 320. For example, each of the first flow switching portion 310 and the second flow switching portion 320 may include a three-way valve.

The radiator 330 may be installed at one side of the outdoor heat exchanger 120, and the cooling water passing through the radiator 330 may be heat-exchanged with external air by driving the outdoor fan 122. In this process, the refrigerant may be cooled.

When the cooling water pump 300 is driven, the cooling water stored in the cooling water tank 305 may pass through the engine 200 and an exhaust gas heat exchanger 240, which will be described later, and then pass through the first flow switching portion 310 and the second flow switching portion 320 to selectively flow to the radiator 330 or the auxiliary heat exchanger 150.

The gas heat pump system 10 includes an engine 200 that generates power for driving the compressor 110 and a mixer 220 that is disposed at an inlet side of the engine 200 to supply a mixed fuel.

Also, the gas heat pump system 10 includes an air filter 210 that supplies purified air to the mixer 220 and a zero governor 230 for supplying a fuel having a predetermined pressure or less. The zero governor may be understood as a device that constantly regulates and supplies an outlet pressure regardless of a change of a magnitude or flow rate of an inlet pressure of the fuel.

The air passing through the air filter 210 and the fuel discharged from the zero governor 230 are mixed in the mixer 220 to form a mixed gas. In addition, the mixed gas may be supplied to the engine 200.

In addition, the gas heat pump system 10 further include an exhaust gas heat exchanger 240 which is provided at an outlet side of the engine and into which an exhaust gas generated after the mixed gas is burned is introduced and a muffler 250 provided at an outlet side of the exhaust gas heat exchanger 240 to reduce noise of the exhaust gas. In the exhaust gas heat exchanger 240, heat exchange may be performed between the cooling water and the exhaust gas.

Also, an oil tank 205 for supplying an oil to the engine 200 may be provided at one side of the engine 200.

As described above, the engine 200 applied to the gas heat pump system 10 uses household LNG or LPG as a fuel.

However, when supplying air to the engine 200 in a natural intake manner, and supplying the household LNG or LPG as a fuel, there is a problem in that an output of the engine 200 is reduced due to a low supply pressure (1 kPa to 2.5 kPa).

Also, in the summer, the gas heat pump system 10 operates in a cooling mode to reduce a temperature in the room. When the outdoor temperature is high, high-temperature air is supplied to the engine 200 due to the high temperature.

Thus, low-density air is supplied to the engine 200 to reduce an output of the engine 200. As a result, the output of the engine 200 may not be maintained with a high cooling load, which causes cooling failure.

Also, to solve this problem, like an engine of a vehicle, after pressurizing air by using a turbocharger, when supplying the fuel while adjusting an amount of fuel according to the air amount, a supply pressure (about 2.5 kPa) of the gas fuel within tube is less than a supercharging pressure (about 30 kPa), and thus, there is also a problem in that it is difficult to supply the fuel.

In case of the present invention, in order to solve this problem, a turbocharging device 400 and a regulator 600 are provided between the mixer 220 and the engine 200.

In detail, after the air and fuel are mixed in the mixer 220, the turbocharging device 400 compresses the discharged mixed gas to discharge the mixed gas toward the engine 200. Here, the turbocharging device 400 may compress the air and the fuel in the mixer 220 at an atmospheric pressure or more.

For example, the turbocharging device 400 is provided as a turbocharger driven by the exhaust gas of the engine 200.

For another example, the turbocharging device 400 may be provided as a supercharger driven by power of the engine 200 or an electric motor.

Also, the regulator 600 is disposed between the turbocharging device 400 and the engine 200 to control an amount of compressed mixed gas supplied to the engine 200.

For example, the regulator 600 may be provided as a valve to which an electronic throttle control (ETC) manner is applied.

According to the present invention, the fuel and the air are mixed in the mixer 220, and after being pressurized at a high pressure in the turbocharging device 400, the mixed gas may be supplied to the engine 200. Also, an amount of high-pressure mixed gas (air+fuel) supplied to the engine 200 through the regulator 600 may be precisely controlled.

Therefore, efficiency of the engine 200 may be improved. Also, a maximum output of the engine 200 may increase without increasing in size of the engine 200. That is, an output of a large engine may be realized with a small engine.

When the mixed gas passes through the turbocharging device 400 as described above, the pressure and temperature of the mixed gas increase. In this case, a density of the mixed gas suctioned into the engine 200 is reduced, and volume efficiency of the engine inevitably decreases.

In case of the present invention, in order to solve this, an intercooler 500 that cools the high-temperature high-pressure mixed gas discharged from the turbocharging device 400 to decrease in volume and increase in density so as to discharge the mixed gas is provided between the turbocharging device 400 and the regulator 600.

For example, the intercooler 500 may allow external air or cooling water to be heat-exchanged with the mixed gas.

According to this, it is possible to decrease in temperature of the mixed gas supplied to the engine 200 and increase in density of the mixed gas, thereby improving the volume efficiency of the engine 200.

When the turbocharging device 400 and the intercooler 500 are provided between the mixer 220 and the engine 200 as described above, a length of the passage in which the mixed gas stays inevitably increases. Here, if there is a large amount of moisture in the air, the mixed gas and water react to generate formic acid to damages the tube, thereby increasing in risk of explosion.

In case of the present invention, when an 'operation stop command' is input from a manager so as to prevent this phenomenon, the engine 200 is driven until the engine 200 stops in a closed state of the regulator 600, to burn the mixed gas, or the mixed gas is discharged to the outside to suppress an occurrence of formic acid, thereby preventing a risk of damage and explosion of the tube.

Also, the intercooler 500 may be made of a corrosion-resistant material (e.g., STS316).

The cooling water tube 360 includes a first tube 361 extending from the radiator 305 toward the engine 200. In detail, the first tube 361 may include a first tube portion extending from the cooling water tan 305 to the exhaust gas heat exchanger 240 and a second tube portion extending from the exhaust gas heat exchanger 240 to the engine 200. Thus, the cooling water supplied from the cooling water tank 305 is heat-exchanged with the exhaust gas while passing through the exhaust gas heat exchanger 240 and then is introduced into the engine 200 to collect waste heat of the engine 200. Also, the first tube 361 may be provided with a cooling water pump 300 that generates a flow of the cooling water.

The cooling water tube 360 further includes a second tube 362 that guides the cooling water passing through the engine 200 to the first flow switching portion 310.

Also, the cooling water tube 360 further includes a third tube 363 that guides the cooling water from the first flow switching portion 310 to the second flow switching portion 320.

Also, the cooling water tube 360 further includes a fourth tube 364 that guides the cooling water from the second flow switching portion 320 to the auxiliary heat exchanger 150.

The cooling water tube 360 further includes a fifth tube 365 that guides the cooling water from the second flow switching portion 320 to the radiator 150.

The cooling water tube 360 further includes a sixth tube 366 that guides the cooling water from the first flow switching portion 310 to the first tube 361.

For example, when a temperature of the cooling water passing through the engine 200 is below a predetermined temperature, an effect of being heat-exchanged by allowing the cooling water to flow to the auxiliary heat exchanger 150 or the radiator 330 may be insignificant. Thus, the cooling water introduced into the first flow switching portion 310 may be bypassed to the first tube 361 through the sixth tube 366. The sixth tube 366 may be referred to as "bypass tube".

The gas heat pump system 10 may further include a cooling water temperature sensor 290 installed at an outlet side of the engine 200 to sense a temperature of the cooling water passing through the engine 200.

Hereinafter, effects of the refrigerant, the cooling water, and the mixed fuel according to the operation mode of the gas heat pump system 10 according to the first embodiment of the present invention will be described.

FIG. 2 is a cycle view illustrating a flow of the refrigerant, the cooling water, and the mixed fuel during a heating operation of the gas heat pump system.

First, when the gas heat pump system 10 performs a heating operation, the refrigerant passes through the compressor 110, the oil separator 115, the four-way valve 117, the indoor heat exchanger 140, and the supercooled heat exchanger 130 and is decompressed in the main expansion device 125 so as to be heat-exchanged in the outdoor heat exchanger 120 and then is introduced again into the four-way valve 117. Here, the indoor heat exchanger 140 may function as a "condenser", and the outdoor heat exchanger 120 may function as an "evaporator".

The refrigerant passing through the four-way valve 117 may flow into the auxiliary heat exchanger 150 so as to be heat-exchanged with the cooling water flowing through the fourth tube 364. The refrigerant flowing into the auxiliary heat exchanger 150 provides a low temperature and low pressure as an evaporated refrigerant, and the cooling water supplied to the auxiliary heat exchanger 150 provides a high temperature by heat of the engine 200. Thus, the refrigerant of the auxiliary heat exchanger 150 may absorb heat from the cooling water to improve evaporation performance.

The refrigerant heat-exchanged in the auxiliary heat exchanger 150 may be introduced into the gas/liquid separator 160 so as to be phase-separated and then be suctioned into the compressor 110. The refrigerant may repeatedly flow.

When the cooling water pump 300 is driven, the cooling water discharged from the cooling water pump 300 flows into the exhaust gas heat exchanger 240 along the first tube 361 so as to be heat-exchanged with the exhaust gas. Then, the cooling water discharged from the exhaust gas heat exchanger 240 flows into the engine 200 to cool the engine 200 and then is introduced into the first flow switching portion 310 via the second tube 362.

The cooling water passing through the first flow switching portion 310 may flow toward the second flow switching portion 320 along the third tube 363 by control of the first flow switching portion 310. Also, the cooling water passing through the second flow switching portion 320 may be introduced into the auxiliary heat exchanger 150 via the fourth tube 364 and then be heat-exchanged with the refrigerant. Then, the cooling water passing through the auxiliary heat exchanger 150 is introduced into the cooling water pump 300. The cooling water may flow through this cycle repeatedly.

When the heating operation is performed, the flow of cooling water to the radiator 330 may be restricted. In general, since the heating operation is performed when the external air has a low temperature, even if the cooling water is not cooled in the radiator 330, possibility of cooling in the process of flowing along the cooling water tube 360 increases. Thus, during the heating operation, the first and second flow switching portions 310 and 320 may be controlled so that the cooling water does not pass through the radiator 330.

However, when heat exchange in the auxiliary heat exchanger 150 is not required, the cooling water may be introduced from the second flow switching portion 320 into the radiator 330 via the fifth tube 365.

The driving of the engine 200 will be described.

The air filtered by the air filter 210 and the fuel regulated in pressure through the zero governor 230 are mixed in the mixer 220. The mixed gas mixed in the mixer 220 is pressurized by the turbocharging device 400, and the pressurized mixed gas is cooled in the intercooler 500 to increase in density. An amount of mixed gas passing through the intercooler 500 is adjusted through the regulator 600 and supplied to the engine 200 to drive the engine 200. Then, the exhaust gas discharged from the engine 200 flows into the exhaust gas heat exchanger 240 so as to be heat-exchanged with the cooling water and then is discharged to the outside through the muffler 250.

FIG. 3 is a cycle view illustrating a flow of the refrigerant, the cooling water, and the mixed fuel during a cooling operation of the gas heat pump system.

When the gas heat pump system 10 performs a cooling operation, the refrigerant passes through the compressor 110, the oil separator 115, the four-way valve 117, the outdoor heat exchanger 120, and the supercooled heat exchanger 130 and is decompressed in the indoor expansion device 145 so as to be heat-exchanged in the indoor heat exchanger 140 and then is introduced again into the four-way valve 117. Here, the outdoor heat exchanger 120 may function as a "condenser", and the indoor heat exchanger 120 may function as an "evaporator".

The refrigerant passing through the four-way valve 117 may flow into the auxiliary heat exchanger 150 so as to be heat-exchanged with the cooling water flowing through the cooling water tube 360. Also, the refrigerant heat-exchanged in the auxiliary heat exchanger 150 may be introduced into the gas/liquid separator 160 so as to be phase-separated and then be suctioned into the compressor 110. The refrigerant may repeatedly flow.

When the cooling water pump 300 is driven, the cooling water discharged from the cooling water pump 300 flows into the exhaust gas heat exchanger 240 so as to be heat-exchanged with the exhaust gas. Then, the cooling water discharged from the exhaust gas heat exchanger 240 flows into the engine 200 to cool the engine 200 and then is introduced into the first flow switching portion 310. The flow of the cooling water until the cooling water flows into the first flow switching portion 310 is the same as the flow of the cooling water during the heating operation.

The cooling water passing through the first flow switching portion 310 is introduced into the second flow switching portion 320 to flow to the radiator 330 under the control of the second flow switching portion 320 so as to be heat-exchanged with the external air. Then, the cooling water cooled in the radiator 330 is introduced into the cooling water pump 300. The cooling water may flow through this cycle repeatedly.

During the cooling operation, the flow of the cooling water to the auxiliary heat exchanger 150 may be restricted. In general, since the cooling operation is performed when the temperature of the external air is high, heat absorption of the evaporating refrigerant for securing evaporation performance may not be required. Thus, in the cooling operation, the first and second flow switching portions 310 and 320 may be controlled so that the cooling water does not pass through the auxiliary heat exchanger 150.

However, when the heat exchange in the auxiliary heat exchanger 150 is required, the cooling water may be introduced into the auxiliary heat exchanger 150 via the second flow switching portion 320.

Regarding the driving of the engine 200, the same operation as during the heating operation is omitted here.

FIG. 4 is a system view illustrating an example of an engine module that is one of components according to the present invention.

Referring to FIG. 4, the turbocharging device 400 may be provided as a turbocharger.

The 'turbocharger' uses the exhaust gas discharged from the engine 200 to allow the turbine 411 to rotate and then pressurizes (compresses) the gas introduced by rotational force to discharge the gas.

Thus, when the turbocharging device 400 is provided as a turbocharger, the turbocharger is connected to an exhaust manifold of the engine 200 through an exhaust tube 191 to rotates, and when the mixed gas mixed in the mixer is introduced, the mixed gas is pressurized (compressed) and then discharged toward the intercooler 500.

Also, a rotation shaft of the turbocharger may receive an oil from the engine 200 for purposes such as lubrication.

Referring to FIGS. 1 to 3, the engine module may further include an oil tank 205 provided outside the engine 200 to store the oil, an oil supply tube 206 supplying the oil of the oil tank 205 to the inside of the engine 200, an oil pump 207 providing power for transferring the oil collected in an oil pan (not shown) inside the engine 200 to the oil tank 205, and an oil supply tube (not shown) connected to the oil pump 207 to supply at least a portion of the oil transferred to the oil pump 207 to the turbocharging device 400.

That is, when the engine 200 is driven, a portion of the oil circulated by the oil pump constitutes an additional flow path to the turbocharging device 400.

As described above, the oil supplied to the turbocharging device 400 may be collected to an oil tank outside the engine 200 after passing through the rotation shaft (power transmission shaft connecting the turbine to the compressor) of the turbocharging device 400.

In this embodiment, a temperature sensor may be attached to a point at which the oil is introduced into the turbocharging device 400 and a point at which the oil is discharged from the turbocharging device 400.

Also, after sensing a temperature change of the oil through the temperature sensor, when the oil temperature excessively increases, the oil used in the turbocharging device 400 is cooled by using an oil cooler (not shown). Thus, damage to the turbocharging device 400 by the high-temperature oil may be prevented, and oil carbonization may be prevented.

When the turbocharging device 400 is a turbocharger as described above, heat dissipation of the turbocharger is required. For example, the turbocharger may dissipate heat while being heat-exchanged with the cooling water.

For the heat dissipation of the turbocharger, the cooling water tube 360 may include a first cooling water tube 360*a* and a second cooling water tube 360*b*.

In detail, the first cooling water tube 360*a* is disposed between the exhaust gas heat exchanger 240 and the engine 200 to guide the cooling water passing through the exhaust gas heat exchanger 240 toward the engine 200.

For another example, the first cooling water tube 360*a* may also include a cooling water tube before passing through the exhaust gas heat exchanger 240. That is, the first cooling water tube 360*a* may mean the cooling water tube between the cooling water pump 300 and the engine 200.

The second cooling water tube 360*b* is branched from the first cooling water tube 360*a* so that at least a portion of the cooling water flowing through the first cooling water tube 360*a* is heat-exchanged with the turbocharging device 400. The cooling water introduced into the second cooling water tube 360*a* flows to the engine 200 after passing through the turbocharging device 400.

Here, the second cooling water tube 360*b* is branched from the first cooling water tube 360*a* before the turbocharging device 400, and after passing through the turbocharging device 400, the first cooling water tube 360*a* is combined with the first cooling water tube 360*a* so that the cooling water is supplied to the engine 200.

The turbocharging device 400 may be provided as a supercharger.

The supercharger generates rotational force by the power of the engine 200 or by an electric motor to pressurizes (compresses) the introduced gas to discharge the gas. Thus, when the turbocharging device 400 is provided as the supercharger, the supercharger may pressurizes (supercharges) the mixed gas that is mixed in the mixer by using the power of the engine 200 or the rotational force of the electric motor to discharge the mixed gas toward the intercooler 500.

In general, the supercharger operates stably in a low-rotation region and tends to cause an output loss in a high-rotation region. Thus, the supercharger or the turbocharger may be selected and used as the turbocharging device 400 according to the operating conditions of the engine, the required output conditions, and the like.

When the turbocharging device 400 is the supercharger as described above, since the heat dissipation problem is not prominent like the turbocharger, there is no need to additionally install the cooling water tube for cooling the turbocharging device 400. Thus, there is an advantage that the structure of the passage is simplified, space utilization is improved, and miniaturization is possible.

Hereinafter, the structure of the 'engine module' which is a main component of the present invention will be described in more detail.

FIG. 5 is a system view of an engine module according to another embodiment of the present invention. Also, FIG. 6 is a perspective view of the engine module that is one of the components when viewed in a direction of an exhaust manifold according to the present invention. Also, FIG. 7 is a view illustrating a flow of cooling water in the engine module of FIG. 6. Also, FIG. 8 is a perspective view of the engine module that is one of the components when viewed in a direction of an intake manifold according to the present invention.

In the following description, a case in which a turbocharging device 400 is provided as a 'turbocharger' will be described as an example, but the scope of the present invention is not limited thereto, and the turbocharging device 400 may be applied in various manners known in the art.

The turbocharger 400 includes a turbine chamber 410 that receives an exhaust gas so that a turbine 411 disposed therein rotates, a compression chamber 420 in which a mixed gas supplied from the mixer 220 is compressed while rotating together with the turbine 411, and a rotation shaft 430 transmitting rotational force of the turbine chamber 410 to the compression chamber 420. Also, the compression chamber 420 may be provided with an impeller 421 that is connected to the rotation shaft 430 to rotates so as to compress the mixed gas introduced into the compression chamber 420.

The exhaust gas discharged from the exhaust manifold 270 is immediately introduced into the turbine chamber 410 to allow the turbine 411 to rotate, and the rotational force is transmitted to the compression chamber 420 through the rotation shaft 430. Also, the mixed gas supplied from the mixer 220 is compressed by the rotating impeller 421 connected to the rotation shaft 430 while passing through the inside of the compression chamber 420, and then discharged to the outside of the compression chamber 420. In this process, the compression of the mixed gas may be performed.

The turbine chamber 410 includes an inflow hole through which the exhaust gas discharged from the exhaust manifold 270 of the engine 200 flows and a discharge hole through which the exhaust gas is discharged after allowing the turbine 411 to rotate.

Here, the inflow hole of the turbine chamber 410 may be directly connected to an exhaust gas discharge hole 271 (see FIG. 12) defined in the exhaust manifold 270 of the engine 200. When the inflow hole and the exhaust gas discharge hole 271 of the turbine chamber 410 are directly connected as described above, a tube connecting the inflow hole to the exhaust gas discharge hole may be omitted, and thus, a structure thereof may be simplified, and a flow path of the exhaust gas may be shortened. Therefore, the power of the exhaust gas in the turbine chamber 410 may be maximally collected.

The compression chamber 420 includes a second inflow hole 422 (see FIG. 12) through which the mixed gas discharged from the mixer 220 flows and a second discharge hole 423 (FIG. 12) through which the compressed mixed gas is discharged. The second inflow hole 422 and the second discharge hole 423 communicate with a space within the compression chamber 420. Thus, the mixed gas mixed in the mixer 220 flows into the compression chamber 420 through the second inflow hole 422 and is compressed by the rotating impeller 421. Thereafter, the compressed mixed gas is discharged to the outside of the compression chamber 420 through the second discharge hole 423.

The compressed mixed gas discharged out of the compression chamber 420 as described above flows to the intercooler 500 to increase in density.

For example, the intercooler 500 may include a body portion 510 providing a space in which heat exchange between the cooling water supplied from the outside and the compressed mixed gas is performed and having both opened sides, an inflow portion 520 disposed at the opened one side of the body portion 510 and having an inflow hole 521 (see FIG. 12) connected to an outlet side of the turbocharging device 400, and a discharge portion 530 having a discharge hole 531 (see FIG. 12) defined in the other side of the body portion 510 and connected to an inlet side of the regulator 600.

Also, the intercooler 500 may be disposed above the turbocharging device 400 and the regulator 600, the inflow hole 521 of the intercooler 500 and the discharge hole 423 of the turbocharging device 400 may be provided to be inclined downward from the intercooler 500 side toward the turbocharging device 400 and may be connected to each other through a first connector 810 that is bent in the form of 'U' or 'J'.

Also, the discharge hole 531 of the intercooler 500 is directly connected to the inflow hole 610 of the regulator 600 (see FIG. 12) or is provided to be inclined downward from the intercooler 500 toward the regulator 600. The discharge hole 531 and the inflow hole 610 may be connected to each other through a second connection tube 820 that is bent in the form of ']'.

The mixer 220 may be fixed to the intercooler 500.

For this, a mixer coupling portion 560 to which the mixer 220 is coupled may be disposed at the inflow portion 520 of the intercooler 500.

The mixer coupling part 560 has a hollow shape so that the mixed gas is discharged to the turbocharging device 400 after the mixed gas passing through the mixer 220 is introduced.

Thus, the mixed gas discharged from the mixer 220 may pass through the hollow 561 of the mixer coupling part 560 and then be introduced into the turbocharging device 400 through the third tube (see reference numeral '830' in FIG. 12) that is bent in the form of '⊏'.

Also, the engine module further includes an air filter 210 for purifying external air, and at least a portion of an air tube 215 connecting the air filter 210 to the mixer 220 may be provided in a straight line.

When the air tube 215 is provided in a straight line as described above, air flowability may be improved. That is, in a straight-line section, the flow of the air is smoothly performed so that the air supply to the mixer 220 is easily performed.

In addition, a portion of the air tube 215 may be provided in the form of a curve.

Also, the air filter 210 and the mixer 220 may be fixed at the same height.

When the air filter 210 and the mixer 220 are fixed to the same height as described above, the air flow is more smoothly performed, and thus, the air supply to the mixer 220 may be more easily performed.

According to the present invention as described above, it is possible to minimize air intake resistance of the mixer 220 by providing the air tube 215 connecting the air filter 210 to the mixer 220 in a horizontal and straight line.

The engine module includes a cooling module.

For example, the cooling module may include a cooling water tank 305 in which cooling water is stored, a cooling water pump 300 generating a flow of the cooling water, and a plurality of tubes 360 supplying the cooling water discharged from the cooling water pump 300 to the engine 200 and the turbocharging device 400. Also, the engine module further includes an exhaust gas heat exchanger 240 in which the exhaust gas passing through the turbocharging device 400 is heat-exchanged with the cooling water to collect heat generated in the engine.

The existing exhaust gas heat exchanger is provided in the form of a shell tube, which is attached directly to the exhaust manifold. However, according to the present invention, when a turbocharger is additionally applied between the exhaust manifold and the exhaust gas heat exchanger, the exhaust gas discharged from the exhaust manifold passes through the turbocharger before flowing to the exhaust gas heat exchanger to affect the driving of the turbine and also adversely affect engine efficient due to an exhaust gas pressure difference generated when the turbine is driven, and thus, it is difficult to sufficiently secure an amount of heat to be collected in the existing shell-tube type exhaust gas heat exchanger.

Thus, it is necessary to apply the exhaust gas heat exchanger having the improved effect in terms of the differential pressure, and simultaneously, it is necessary to change the coupling type and structural position with the turbocharger.

As described above, when the turbocharging device 400 is provided as the turbocharger, it is necessary to collect heat generated in the turbocharger by sufficiently circulating the cooling water so as to secure reliability.

In detail, when a temperature of the turbocharger is excessively overheated and increases above a certain level, the components of the turbocharger are damaged due to thermal deformation and resulting fatigue destruction.

Since this affects the reliability of the turbocharging device and the entire system, it is necessary to sufficiently circulate the cooling water so as to discharge the heat generated by the turbocharger. In general, in case of the turbocharger, since heat is generated by compressing the mixed gas in an impeller, and the exhaust gas is injected into the turbine at a high temperature to generate power, the temperature is generally high.

However, if a separate cooling water line including a circulation pump is additionally installed to cool the turbocharger, a volume and weight of the entire system increases, and manufacturing costs increase.

In the case of the general engine module, a cooling water passage for discharging heat generated in the engine 200 is provided.

Therefore, in case of the present invention, a method of cooling the turbocharger in a simple manner in a portion of the cooling water supplied to the engine 200 is branched and injected into the turbocharger is adopted.

In detail, a cooling water flow direction in the gas engine heat pump passes through the exhaust gas heat exchanger to flow toward the exhaust manifold with respect to the cooling water pump and then is introduced into the engine. Also, the turbocharger applied to the gas engine heat pump according to the present invention has a structure in which the turbocharger is directly attached to the exhaust manifold, and then exhaust gas heat exchanger is fixed. Thus, in the configuration of the cooling water passage for the turbocharger, the cooling of the turbocharger may be performed in a manner in which a portion of the cooling water used in the exhaust gas heat exchanger is extracted and injected into the turbocharger, and the cooling water passing through the turbocharger is combined toward the cooling water passage of the exhaust manifold.

For this, the cooling water tube 360 includes main tubes 367a and 367b supplying the cooling water to the exhaust manifold 270 of the engine 200 and branch tubes 368a and 368b supplying the cooling water to the turbocharging device 400.

The exhaust gas heat exchanger 240 includes a cooling water inflow tube 243 through which the cooling water supplied from the cooling water pump 300 flows, a heat exchange chamber 244 in which the cooling water introduced into the cooling water inflow tube 243 and the exhaust gas introduced into the exhaust gas heat exchanger 240 are heat-exchanged with each other, and a cooling water discharge tube 245 through which the cooling water heat-exchanged with the exhaust gas is discharged.

Here, a flow direction of the cooling water and a flow direction of the exhaust gas may be provided in opposite directions.

In detail, referring to FIG. 6, the tube may be connected so that the exhaust gas flows from left to right, and the cooling water flows from right to left.

As described above, when the cooling water and the exhaust gas flow in directions crossing each other, the exhaust gas and the cooling water cross each other, and thus, the heat exchange between the cooling water and the exhaust gas may more quickly and uniformly performed.

Also, the exhaust gas heat exchanger 240 may be directly fixed to the engine 200. In detail, the exhaust gas heat exchanger 240 may be directly fixed to the exhaust manifold 270 of the engine 200. Her, a fixing portion such as a clamp for fixing the exhaust gas heat exchanger 240 to the exhaust manifold 270 may be separately provided.

For example, the engine module further include a grip portion 810 coupled to the exhaust gas heat exchanger 240 in a manner of gripping a central portion of the exhaust gas heat exchanger 240 and having the other side fixed to the engine 200.

For example, the grip portion 810 may be provided in a clamping manner.

Also, the grip portion 810 may be provided in a type in which one side thereof gripping the exhaust gas heat exchanger 240 is tightened. In detail, when one side of the grip portion 810 is tightened using a screw or the like, an inner space is reduced, and the exhaust gas heat exchanger 240 fitted in the inner space is pressed, and as a result, the exhaust gas heat exchanger 240 is fixed to the grip portion 810.

When the grip portion 810 is provided as described above, fixing force of the engine 200 and the exhaust gas heat exchanger 240 may be secured, and an influence of vibration of the engine 200 applied to the exhaust gas heat exchanger 240 may be reduced.

In this embodiment, a buffer material 820 made of a cushion material may be provided on an inner surface of the grip portion 810 that grips the exhaust gas heat exchanger 240 to absorb vibration or impact. Since the buffer material 820 is provided as described above, the fixing force of the grip portion 810 and the exhaust gas heat exchanger 240 may increase, and the vibration or impact applied to the exhaust gas heat exchanger 240 is alleviated to dampen the vibration, thereby improving durability of the exhaust gas heat exchanger 240, the grip portion 810, and the connected portions.

Thus, one side of the exhaust gas heat exchanger 240, through which the exhaust gas flows, is fixed to the turbocharger, and the central portion may be fixed to the engine 200 by the grip portion 810.

In this embodiment, the exhaust gas heat exchanger 240 may be disposed to be adjacent to the exhaust manifold 270 and overlap the exhaust manifold 270 in FIGS. 9 and 11.

When the exhaust gas heat exchanger 240 is fixed as close as possible to the exhaust manifold 270 by the grip portion 810 as described above, the effect of the vibration of the engine 200 applied to the exhaust gas heat exchanger 240 may be maximally reduced.

In addition, the other side of the exhaust gas heat exchanger 240, through which the exhaust gas is discharged, may be fixed by a separate support frame 830.

In detail, an exhaust gas discharge tube 247 that is disposed to be faced downward, an extension portion 248 extending in a direction (direction toward the exhaust manifold) crossing the exhaust gas discharge tube 247, and a protrusion portion 249 protruding downward from a bottom surface of the extension portion 248 are disposed on the other side of the exhaust gas heat exchanger 240, and an upper end of the support frame 830 is disposed parallel to the extension portion 248 and coupled to the protrusion portion 249 at a lower side of the extension portion 248. For example, a hole may be defined in a position of an upper end of the support frame 830, which corresponds to the protrusion portion 249, and a coupling portion such as a bolt, a screw, and the like may be coupled to the protrusion portion 249 through the hole.

As described above, both ends and the central portion of the exhaust gas heat exchanger 240 may be fixed to the engine 200 to secure the fixing force of the exhaust gas heat exchanger 240, and the vibration applied to the exhaust gas heat exchanger 240 due to the influence of the engine 200 may be dampened.

Also, when the engine 200 vibrates, the exhaust gas heat exchanger 240 also vibrates in the same direction as the engine 200, and as a result, the engine 200 and the exhaust gas heat exchanger 240 vibrate in opposite directions to prevent relative movement from occurring.

Also, the discharge tube 247 is provided at the lowermost end of the exhaust gas heat exchanger 240 to face a lower side, and thus, condensed water generated in the exhaust gas heat exchanger 247 is easily discharged, and the discharge tube 247 is more easily connected to a silencer 910 that is disposed below the exhaust gas heat exchanger 240.

The exhaust gas discharged from the exhaust manifold 270 allows the turbine to rotate while passing through the turbine chamber 410 of the turbocharging device 400, and the exhaust gas discharged from the turbine chamber 410 is heat-exchanged with the cooling water while passing through the exhaust gas heat exchanger 240.

The exhaust gas passing through the exhaust gas heat exchanger 240 has a low temperature through heat dissipation and is discharged to the atmosphere through a muffler 250. The cooling water passing through the exhaust gas heat exchanger 240 increase in temperature through heat absorption and is collected to the cooling water tank 305 through the exhaust manifold 270 and the radiator 330.

Here, similarly, the exhaust gas heat exchanger 240 and the turbine chamber 410 of the turbocharging device 400 may be directly connected to each other without a separate tube. That is, a first discharge hole (not shown) of the turbine chamber 410 and an exhaust gas inflow hole 241 (see FIG. 12) of the exhaust gas heat exchanger 240 may be directly connected to each other.

Here, when an exhaust gas inlet side of the exhaust gas heat exchanger 240 and the turbine chamber 410 of the turbocharging device 400 are directly connected to each other, there is an effect of reducing exhaust resistance and exhaust differential pressure. Also, there is an advantage of easily collecting thermal energy.

In addition, in order to directly connect the exhaust gas inlet side of the exhaust gas heat exchanger 240 to the turbine chamber 410 of the turbocharging device 400, a first discharge hole (not shown) of the turbine chamber 410 and the exhaust gas inflow hole 241 of the exhaust gas heat exchanger 240 may provide flanges 242 and 413 extending outward along circumferences thereof.

Also, in a state in which the flanges 242 and 413 provided on the first discharge hole (not shown) of the turbine chamber 410 and the exhaust gas inflow hole 241 of the heat exchanger 240 are in surface contact with each other, the flanges may be coupled to each other through coupling portions such as bolts or the like.

Hereinafter, the 'exhaust gas heat exchanger' will be described in more detail.

FIG. 9 is a front view illustrating a state in which the exhaust gas heat exchanger is mounted on the engine module. Also, FIG. 10 is a perspective view of the exhaust gas heat exchanger that is one of the components according to an embodiment. Also, FIG. 11 is a front view illustrating further another example of the engine module.

Referring to FIGS. 9 to 11, the exhaust gas heat exchanger 240 has one side in which the exhaust gas is introduced and higher than the other side thereof in which the exhaust gas is discharged so as to be inclined downward from the one side to the other side.

In general, when the heat exchange occurs inside the exhaust gas heat exchanger 240, a problem occurs that condensed water is generated on a gas line (passage through which the gas passes). When the condensed water is generated as described above, the generated condensed water has to be discharged because corrosion in the exhaust gas heat exchanger 240 occurs to cause damage of the exhaust gas heat exchanger 240.

In case of the present invention, a separate component and a drain line are not provided so as to remove the condensed water, and when the exhaust gas heat exchanger 240 is mounted on the engine 200, the exhaust gas heat exchanger 240 is mounted at an inclination (e.g., about 8°) so that the condensed water is discharged naturally by the force of gravity.

According to the present invention, the condensed water discharge may naturally occur to prevent the phenomenon in which the exhaust gas heat exchanger 240 corrodes or is damaged by the condensed water from occurring. In addition, the separate structure for discharging the condensed water may not be added to simplify a structure, reduce manufacturing costs, and increase in productivity.

As described above, the condensed water discharged to the outside of the exhaust gas heat exchanger 240 along an inclined surface flows to the silencer 910 disposed lower than an outlet of the exhaust gas heat exchanger 240 through the exhaust tube 930 and then is mixed with the condensed water within the silencer 910 to flow a drain filter 920 disposed lower than the silencer 910 through the condensed water tube 940.

Thereafter, the condensed water may be discharged to the outside through a condensed water discharge tube 921 provided in the drain filter 920.

When the exhaust gas heat exchanger 240 is inclined as described above, the flange 242 disposed on the exhaust gas inflow hole 241 of the exhaust gas heat exchanger 240 is also inevitably disposed to be inclined.

That is, as illustrated in FIG. 9, an end of the flange 242 of the exhaust gas heat exchanger 240 has be inclined at a predetermined angle in a direction in which the exhaust gas heat exchanger 240 is inclined with respect to the vertical direction. In this situation, when the flange 413 disposed the first discharge hole (not shown) of the turbine chamber 410 is provided in parallel with the vertical direction, the flanges 242 and 413 on both sides is difficult to surface contact each other. Thus, exhaust gas heat exchanger 240 and the turbine chamber 410 may not be properly connected to each other, and leakage of the exhaust gas may inevitably occur.

In case of the present invention, in order to prevent this phenomenon, the flange 413 provided on the first discharge hole (not shown) of the turbine chamber 410 is inclined at the same angle as the flange 242 of the exhaust gas heat exchanger 240. As a result, the flange 413 of the turbine chamber 410 and the flange 242 of the exhaust gas heat exchanger 240 are disposed in parallel with each other to surface contact each other, and thus, the exhaust gas heat exchanger 240 and the turbine chamber 410 may be tightly connected each other to prevent the leakage of the exhaust gas.

Hereinafter, a flow of the cooling water will be described in detail with reference to FIG. 7.

First, when the cooling water pump 300 is driven, the cooling water stored in the cooling water tank is supplied to the exhaust gas heat exchanger 240, and primary heat exchange is performed with the exhaust gas while passing through the exhaust gas heat exchanger 240. Thereafter, while the cooling water discharged from the exhaust gas heat exchanger 240 passes through the exhaust manifold 270, secondary heat exchange is performed. As the cooling water flows as described above, an exhaust gas temperature of each of the exhaust manifold 270 and the exhaust gas heat exchanger 240 may decrease. The cooling water heated while passing through the exhaust manifold 270 decreases in temperature while passing through the radiator and then is collected again to the cooling water tank.

Also, a portion of the cooling water passing through the exhaust gas heat exchanger 240 may be branched to cool the turbocharging device 400 while passing through the turbocharging device 400, and also the cooling water passing through the turbocharging device 400 decreases in temperature while passing through the radiator and then is collected again to the cooling water tank.

The radiator may be installed at one side of the outdoor heat exchanger, and the cooling water of the radiator may be heat-exchanged with the external air by driving an outdoor fan and thus is cooled.

Referring again to FIG. 5, the cooling water tube 360 includes a first main tube 367a connecting the cooling water pump 300 to the cooling water inflow tube 243 of the exhaust gas heat exchanger 240 and a second main tube 367b connecting the cooling water discharge tube 245 of the exhaust gas heat exchanger 240 to the exhaust manifold 270 of the engine 200.

For reference, the first main tube 367a and the second main tube 367b may be understood as the same concepts as the first cooling water tube 360a (see FIG. 4).

Accordingly, when the cooling water pump 300 is driven, the cooling water flows through the first main tube 367a, and the cooling water flows through the cooling water inflow tube 243 connected to the first main tube 367a. Thereafter, the cooling water is heat-exchanged with the exhaust gas while passing through the heat exchange chamber 244 and then is charged to the outside of the exhaust gas heat exchanger 240 through the cooling water discharge tube 245. Then, the cooling water flows to the exhaust manifold 270 of the engine 200 through the second main tube 367b connected to the cooling water discharge tube 245, and after heat exchange with the exhaust manifold 270 is performed, the cooling water flows toward the radiator.

FIG. 9 is a front view illustrating a state in which the exhaust gas heat exchanger is mounted on the engine module. FIG. 10 is a perspective view of the exhaust gas heat exchanger that is one of the components according to an embodiment.

A portion of the cooling water is branched before flowing through the exhaust gas heat exchanger 240 and then is supplied to the turbocharging device 400. Here, a branch hole through which the cooling water is branched to be supplied to the turbocharging device 400 may be defined in the cooling water inflow tube 243.

For another example, after flowing through the exhaust gas heat exchanger 240, a portion of the cooling water may be branched and supplied to the turbocharging device 400. For this, the branch hole 246 for supplying the cooling water to the turbocharging device 400 may be defined in the cooling water discharge tube 245 of the exhaust gas heat exchanger 240.

Accordingly, a portion of the cooling water discharged from the exhaust gas heat exchanger 240 may be supplied to the turbocharging device 400 and the rest of the cooling water may be supplied to the exhaust manifold 270.

Also, the cooling water tube 360 may further include a first branch tube 368a connecting the branch hole 246 to the turbocharging device 400 and a second branch tube 368b connecting the turbocharging device 400 to the exhaust manifold of the engine 200.

Also, the first branch tube 368a and the second branch tube 368b (see FIG. 4) may be understood as the same concept as the second cooling water tube 360b described above.

Here, since the cooling has been continuously performed immediately after the turbocharger is driven, there is no need to install a separate valve for controlling a flow of the cooling water in the first branch tube 368a or the branch hole 246.

Accordingly, when the cooling water pump 300 is driven, the cooling water flows through the first main tube 367a, and the cooling water flows through the cooling water inflow tube 243 connected to the first main tube 367a. Thereafter, the cooling water is heat-exchanged with the exhaust gas while passing through the heat exchange chamber 244 and then is charged to the outside of the exhaust gas heat exchanger 240 through the cooling water discharge tube 245.

Here, a portion of the cooling water is branched through the branch hole 246 and then is introduced into a cooling water inlet port 440 of the turbocharging device 400 through the first branch tube 368a connected to the branch hole 246.

Also, the cooling water supplied to the turbocharging device 400 is heat-exchanged while passing through the turbine chamber 410 of the turbocharging device 400 and then is discharged from the turbocharging device 400 through a cooling water discharge port 450 to flow to the exhaust manifold 270 through the second branch tube 368b connected to the cooling water discharge port 450.

Due to this process, the cooling of the turbocharging device 400 may be performed.

The cooling water discharged from the second main tube 367b connected to the cooling water discharge tube 245, but the branch hole 246 flows to the exhaust manifold 270 of the engine 200 so as to be heat exchanged with the exhaust manifold 270 and flows to the radiator.

Here, after passing through the turbocharging device 400, the cooling water discharged to the exhaust manifold 270 may also flow to the radiator after being heat-exchanged with the exhaust manifold 270.

In detail, the cooling water tube 360 may include a third main tube 369 guiding the cooling water passing through the exhaust manifold 270 of the engine 200 to the radiator 330.

Accordingly, after passing through the turbocharging device 400, the cooling water supplied to the exhaust manifold 270 is combined with the cooling water supplied to the exhaust manifold 270 through the second main tube 367*b* bypassing the turbocharging device 400 and then flows to the radiator 330 along the third main tube 369 via the exhaust manifold 270.

Here, the third main tube 369 may be understood as the same concept as the tubes 362, 363, and 365 (see FIG. 1) connecting the engine 200 to the radiator 330, which are described above.

Referring again to FIGS. 6 to 8, at least one or more of the mixer 220, the turbocharging device 400, the regulator 600, or the intercooler 500 may be directly fixed to the engine 200.

In general, the components such as the mixer 220, the turbocharging device 400, the regulator 600, and the intercooler 500, which are provided to compress the mixed gas of the fuel and the air and supply the mixed gas to the engine are fixed to a structure that is separately from the engine 200. In this case, the intake manifold 260 and the exhaust manifold 270 of the engine 200 have to be connected to each other, and thus, the entire length of the tube increases.

Also, as the length of the tube is longer, the structure is complicated, and as the coupling member for fixing each component is separately provided, the structure is more complicated, and a surface area occupied by each component increases to increase in volume and weight of the entire system.

Also, if the components such as the mixer 220, the turbocharging device 400, regulator 600, and the intercooler 500 are fixed to the structure that is separated from the engine 200, when the engine 200 starts, the engine 200 and each component do not vibrate in the same direction, but vibrate in a relatively opposite direction. Thus, there is a problem such as damage of a connection tube and a connected portion of the tube due to the vibration of the engine 200.

Also, when the mixed gas of the fuel and air increases in flow length, there is a problem that a risk of explosion increases.

In case of the present invention, in order to solve this problem, at least one of the components of the mixer 220, the turbocharging device 400, the regulator 600, and the intercooler 500 is directly fixed to the engine 200.

Here, only a portion selected from the mixer 220, the turbocharging device 400, the regulator 600, and the intercooler 500 may be directly fixed to the engine 200. Alternatively, all of the mixer 220, the turbocharging device 400, and the regulator 600, and the intercooler 500 may be fixed to the engine 200.

As described above, when the mixer 220, the turbocharging device 400, the regulator 600, and the intercooler 500 are fixed to the engine 200, there are advantages as follows.

First, the structure for fixing components such as the mixer 220, the turbocharging device 400, the regulator 600, and the intercooler 500 may be omitted, and thus there is an advantage of being structurally simple. Also, it also has the advantage of reducing costs of the components to be fixed.

In addition, each of the components such as the mixer 220, the turbocharging device 400, the regulator 600, and the intercooler 500 may be fixed to the engine 500 to reduce distances between the regulator 600 and the intake manifold 260, between the turbocharging device 400 and the exhaust manifold 270, and between the intercooler 500 and the turbocharging device 400 and thus reduce the length of the entire tube, thereby reducing the surface area occupied by the tube.

In addition, the components such as the mixer 220, the turbocharging device 400, the regulator 600, the intercooler 500, and the like are fixed to the engine 200 to prevent the relative movement phenomenon in which the mixer 220, the turbocharging device 400, the regulator 600, and the intercooler 500, and the like move in the same direction to reduce the vibration applied to the tube and the connected portions, thereby preventing a phenomena in which the tube and the various connected portions are loose or damaged by the vibration, improving durability, and preventing safety accidents.

FIG. 12 is an exploded perspective view illustrating the engine module that is one of the components according to an embodiment.

Referring to FIG. 12, the turbocharging device 400 is disposed adjacent to the exhaust manifold 270 provided on a first surface (right side of FIG. 12) of the engine 200, the regulator 600 is disposed adjacent to the intake manifold 260 provided on a second surface (left side of FIG. 12) of the engine 200, which is opposite to the first surface, and the intercooler 500 is fixed to a third surface (front surface in FIG. 12) in a direction in which the first surface and the second surface cross each other.

Accordingly, the turbocharging device 400 receiving the power from the exhaust manifold 270 may be disposed adjacent to the exhaust manifold 270 to minimize a length of an exhaust gas supply passage disposed between the exhaust manifold 270 and the turbocharging device 400, and the turbocharging device 400 may maximally utilize the power of the exhaust gas.

Also, the regulator 600 for supplying the mixed gas to the intake manifold 260 by adjusting the mixed gas may also be disposed adjacent to the intake manifold 260. Thus, an amount of the mixed gas supplied to the intake manifold 260 may be more precisely adjusted.

Also, the intercooler 500 of which both sides are fixed between the turbocharging device 400 fixed to the exhaust manifold 270 and the regulator 600 fixed to the intake manifold 260 may be fixed between the exhaust manifold 270 and the intake manifold 260 to maintain the minimum distances between the intercooler 500 and the turbocharging device 400 and between the intercooler 500 and the regulator 600. Therefore, the length of the passage through which the mixed gas flows may be reduced to have a minimum value.

For reference, Since maintenance and repair of an engine oil, an ignition plug, a valve clearance, and the like are required through a top surface (upper portion in FIG. 12) of the engine 200, the components such as the intercooler 500 and the lime are not installed on the top surface (upper portion in FIG. 12) of the engine 200.

Hereinafter, an overall operation of the engine module will be described with reference to FIG. 12.

First, the air purified while passing through the air filter 210 and the fuel (LNG) passing through the zero governor are mixed in the mixer 220.

After the mixed gas (air and LNG) mixed in the mixer 220 is discharged from the mixer 220, the mixer 220 passes through the mixer coupling portion 560 of the fixed intercooler 500 and passes through the third tube 830 having a bent shape and then is introduced into the turbocharging device 400.

Here, the turbocharging device 400 is coupled to the exhaust manifold 270 of the engine 200, and the turbocharging device 400 rotates by receiving the power from the exhaust gas of the engine 200, and the mixed gas introduced into the turbocharging device 400 is compressed at a high temperature and high pressure.

Thereafter, the mixed gas compressed in the turbocharging device 400 flows to the intercooler 500 through the discharge tube 401 and the first connection tube 810 having the bent shape.

For example, the intercooler 500 may include a body portion 510 providing a space in which heat exchange between the cooling water supplied from the outside and the compressed mixed gas is performed and having both opened sides, an inflow portion 520 disposed at the opened one side of the body portion 510 and having an inflow hole 521 (see FIG. 12) connected to an outlet side of the turbocharging device 400, and a discharge portion 530 having a discharge hole 531 (see FIG. 12) defined in the other side of the body portion 510 and connected to an inlet side of the regulator 600.

In detail, the compressed mixed gas is introduced through the first connection tube 810 connected to the discharge tube 401 and the inflow hole 521 connected to the first connection tube 810, and the mixed gas introduced into the body portion 510 via the inflow portion 520 is cooled while being heat-exchanged with the cooling water passing through the body portion 510 to increase in density.

Thereafter, the mixed gas having the increasing density is discharged from the intercooler 500 through the discharge portion 530 and the discharge hole 531 and then is introduced into the regulator 600 through the second connection tube 820 connected to the discharge hole 531.

The regulator 600 adjusts an amount of mixed gas introduced from the intercooler 500 to discharge the mixed gas to the engine 200, and then, the mixed gas that is adjusted in amount is introduced into through the intake manifold 260 of the engine 200.

When the mixed gas is introduced into the engine 200 via the intake manifold 260 as described above, combustion is performed inside the engine 200 to generate power for driving the compressor.

The exhaust gas generated in the combustion process is discharged to the outside of the engine 200 through the exhaust manifold 270.

The turbocharging device 400 is connected to the exhaust manifold 270, and the exhaust gas discharged from the exhaust manifold 270 is supplied to the turbocharging device 400 to allow the turbine of the turbocharging device 400 to rotate. Accordingly, the turbocharging device 400 may compress the mixed gas introduced from the mixer 220.

The exhaust gas passing through the turbocharging device 400 is heat-exchanged with the cooling water provided from the cooling water pump 300 while passing through the exhaust gas heat exchanger 240. As described above, the exhaust gas that has undergone the heat exchange is provided to an outlet side of the exhaust gas heat exchanger 240 to pass through the muffler 250 for reducing noise of the exhaust gas and then is discharged to the outside.

After being discharged from the cooling water pump 300, the cooling water, which has undergone the heat exchange in the exhaust gas heat exchanger 240, is supplied to the exhaust manifold 270 through a separate tube, and the cooling water passing through the exhaust manifold 270 is discharged to the outside of the engine 200 to pass through the radiator and then is collected into the cooling water tank connected to the cooling water pump 300.

Also, after being discharged from the cooling water pump 300, a portion of the cooling water, which has undergone the heat exchange in the exhaust gas heat exchanger 240, may be branched through a separate connection tube before flowing to the exhaust manifold 270 and is supplied to the turbocharging device 400, and then, the heat-exchanged cooling water may be collected into the cooling water tank connected to the cooling water pump 300 after passing through the exhaust manifold 270 and the radiator.

According to the present invention as described above, in the exhaust gas heat exchanger, the condensed water discharge may naturally occur to prevent the phenomenon in which the exhaust gas heat exchanger corrodes or is damaged by the condensed water from occurring. In addition, the separate structure for discharging the condensed water may not be added to simplify a structure, reduce manufacturing costs, and increase in productivity.

In addition, both the ends and the central portion of the exhaust gas heat exchanger may be fixed to the engine to secure the fixing force of the exhaust gas heat exchanger, thereby reducing the vibration applied to the exhaust gas heat exchanger due to the effect of the engine.

In addition, the exhaust gas heat exchanger may vibrate in the same direction as the engine when the engine vibrates to prevent the relative movement in which the engine and the exhaust gas heat exchanger vibrate in opposite directions from occurring.

In addition, the turbocharger and the exhaust gas heat exchanger may be directly connected to each other so that it is advantageous in reducing the exhaust differential pressure, and the separate structure for connection is omitted.

In addition, the exhaust gas heat exchanger may be disposed close to the exhaust manifold while newly mounting the fixing portion on the central portion of the exhaust gas heat exchanger to minimize the effect of the vibration generated in the engine, which is applied to the exhaust gas heat exchanger.

FIG. 13 is a view illustrating a flow of air in the engine module of FIG. 8. Also, FIG. 14 is an exploded perspective view illustrating another example of the engine module that is one of the components according to an embodiment.

In general, the components such as the mixer 220, the turbocharging device 400, the regulator 600, and the intercooler 500, which are provided to compress the mixed gas of the fuel and the air and supply the mixed gas to the engine are fixed to a structure that is separately from the engine 200. In this case, the intake manifold 260 and the exhaust manifold 270 of the engine 200 have to be connected to each other, and thus, the entire length of the tube increases.

Also, as the length of the tube is longer, the structure is complicated, and as the coupling member for fixing each component is separately provided, the structure is more complicated, and a surface area occupied by each component increases to increase in volume and weight of the entire system.

Also, if the components such as the mixer 220, the turbocharging device 400, regulator 600, and the intercooler 500 are fixed to the structure that is separated from the engine 200, when the engine 200 starts, the engine 200 and each component do not vibrate in the same direction, but vibrate in a relatively opposite direction. Thus, there is a problem such as damage of a connection tube and a connected portion of the tube due to the vibration of the engine 200.

Also, when the mixed gas of the fuel and air increases in flow length, there is a problem that a risk of explosion increases.

In case of the present invention, in order to solve this problem, at least one of the components of the mixer 220, the turbocharging device 400, the regulator 600, and the intercooler 500 is directly fixed to the engine 200.

At this time, only a portion selected from the mixer 220, the turbocharging device 400, the regulator 600, and the intercooler 500 may be directly fixed to the engine 200, the mixer 220, the turbocharging device 400, and the regulator Both the 600 and the intercooler 500 may be directly fixed to the engine 200.

As described above, when the mixer 220, the turbocharging device 400, the regulator 600, and the intercooler 500 are fixed to the engine 200, there are advantages as follows.

First, the structure for fixing components such as the mixer 220, the turbocharging device 400, the regulator 600, and the intercooler 500 may be omitted, and thus there is an advantage of being structurally simple. Also, it also has the advantage of reducing costs of the components to be fixed.

In addition, each of the components such as the mixer 220, the turbocharging device 400, the regulator 600, and the intercooler 500 may be fixed to the engine 500 to reduce distances between the regulator 600 and the intake manifold 260, between the turbocharging device 400 and the exhaust manifold 270, and between the intercooler 500 and the turbocharging device 400 and thus reduce the length of the entire tube and the passage, thereby reducing the surface area occupied by the tube.

In addition, the components such as the mixer 220, the turbocharging device 400, the regulator 600, the intercooler 500, and the like are fixed to the engine 200 to prevent the relative movement phenomenon in which the mixer 220, the turbocharging device 400, the regulator 600, and the intercooler 500, and the like move in the same direction to reduce the vibration applied to the tube and the connected portions, thereby preventing a phenomena in which the tube and the various connected portions are loose or damaged by the vibration, improving durability, and preventing safety accidents.

Referring to FIGS. 13 to 14, the mixed gas inflow hole 261 of the intake manifold 260 and the mixed gas discharge hole (not shown) of the regulator 600 may be directly connected to each other, and thus, the regulator 600 may be fixed to the engine 200 through the intake manifold 260.

Here, the mixed gas discharge hole (not shown) may mean an outlet (hole) provided in the discharge unit 620 to be described later.

Also, the turbocharging device 400 is disposed adjacent to the exhaust manifold 270 provided on a first surface (right side of FIG. 14) of the engine 200, the regulator 600 is disposed adjacent to the intake manifold 260 provided on a second surface (left side of FIG. 14) of the engine 200, which is opposite to the first surface, and the intercooler 500 is fixed to a third surface (front surface in FIG. 14) in a direction in which the first surface and the second surface cross each other.

Accordingly, the turbocharging device 400 receiving the power from the exhaust manifold 270 may be disposed adjacent to the exhaust manifold 270 to minimize a length of an exhaust gas supply passage disposed between the exhaust manifold 270 and the turbocharging device 400, and the turbocharging device 400 may maximally collect power energy of the exhaust gas.

Also, the regulator 600 for supplying the mixed gas to the intake manifold 260 by adjusting the mixed gas may also be disposed adjacent to the intake manifold 260. Thus, an amount of the mixed gas supplied to the intake manifold 260 may be more precisely adjusted.

Also, the intercooler 500 of which both sides are fixed between the turbocharging device 400 fixed to the exhaust manifold 270 and the regulator 600 fixed to the intake manifold 260 may be fixed between the exhaust manifold 270 and the intake manifold 260 to minimally maintain the distances between the intercooler 500 and the turbocharging device 400 and between the intercooler 500 and the regulator 600. Therefore, the length of the passage through which the mixed gas flows may be reduced to have a minimum value.

For reference, Since maintenance and repair of an engine oil, an ignition plug, a valve clearance, and the like are required through a top surface (upper portion in FIG. 14) of the engine 200, the components such as the intercooler 500 and the lime are not installed on the top surface (upper portion in FIG. 14) of the engine 200.

Hereinafter, shapes and structures of the intake manifold and the regulator will be described in more detail with reference to the drawings.

FIG. 15 is a view illustrating a configuration of an engine module having no supercharging function according to a related art. Also, FIG. 16 is a view illustrating a configuration of an engine module having a supercharging function according to the present invention.

First, referring to FIG. 15, since the engine module according to the related art does not have a supercharging function, various components for the supercharging, for example, the turbocharging device 400, the intercooler 500, and separate components for connecting the above-described components to each other are not installed. For reference, (a) of FIG. 15 is a view illustrating an engine module according to the related art when viewed from the intake manifold side, and (b) of FIG. 15 is a view when viewed from the upper side.

In this case, when the filtered air is supplied through the air filter 210 disposed at one side of the engine 200, air is introduced into the mixer 220 through a tube 215. Thereafter, air and fuel are mixed in the mixer 220, and the mixed gas is supplied to the intake manifold 260 through the regulator 600.

Here, a flow length of the air and the mixed gas may be short, a direction of the passage may be provided in a straight line, the supply of the mixed gas to the intake manifold 260 may be performed in a state in which the flow resistance is minimized, and in order to minimize the length of the passage, a facing direction of the inlet of the intake manifold may be directed to face the air filter 210.

However, in the state in which the intake manifold is disposed as illustrated in FIG. 16, when components such as the turbocharging device 400 and the intercooler 500 are additionally arranged for the supercharging function, the mixed gas discharged from the turbocharging device disposed adjacent to the exhaust manifold 270 may increase in flow length, and also, the passage may be provided in a shape bypassing the engine 200 to increase in flow resistance.

In case of the present invention, in order to solve this phenomenon, the shapes and structures of the regulator 600 and the intake manifold 260 are changed.

In detail, referring to FIG. 16, it is confirmed that the shape of the intake manifold 260 and the arranged structure of the regulator 600 are changed based on the related art.

For reference, FIG. 16(a) is a view illustrating an engine module according to the present invention when viewed from the intake manifold side, and FIG. 16(b) is a view when viewed from the upper side.

First, referring to (a) of FIG. 16, it is confirmed that the shape and the structure are changed so that the intake manifold 260 is disposed in parallel to a sidewall (second surface) of the engine 200, and the direction of the mixed gas inflow hole 261 of the intake manifold 260 is directed in an opposite direction of the air filter 210, but is directed toward the intercooler 500.

Also, it is confirmed that the direction in which the mixed gas flows into the mixed gas inflow hole 261 of the intake manifold 260 is provided from the upper side to the lower side.

That is, in the related art, the direction in which the mixed gas flows into the intake manifold 260 is provided horizontally from left to right based on (a) of FIG. 15, whereas in the case of the present invention, the direction in which the mixed gas flows into the intake manifold 260 is provided vertically downward based on (a) of FIG. 16(a) or is provided to be inclined downward from right to left.

When the arranged structure of the intake manifold 260 is changed as described above, the distance between the intercooler 500 and the intake manifold 260 may be reduced.

Also, the mixed gas discharged downward from the intercooler 500 disposed on the upper side may flow into the intake manifold 260 provided to be faced upward, and thus, the mixed gas smoothly flows, and the flow resistance of the mixed gas is minimized.

Also, in case of the present invention, the intake manifold 260 has the form of a flat box as a whole and is disposed in parallel to the sidewall (second surface) of the engine 200, thereby reducing the volume of the engine module.

In detail, referring to (b) of FIG. 16, it is confirmed that a height of the intake manifold 260 protruding to the outside of the sidewall (second surface) of the engine 200 is reduced compared to the related art (see FIG. 15).

Also, the direction in which the purified air of the air filter 210 is discharged is also provided to be opposite to the direction according to the related art.

In detail, according to the related art, in the air filter, the direction in which the purified air is discharged is provided toward the intake manifold, whereas in the case of the present invention, the discharge direction of the air purified in the air filter 210 is directed to the exhaust manifold.

Accordingly, the air may be smoothly supplied to the mixer 220 disposed adjacent to the exhaust manifold 270. Also, the supply of the mixed gas to the mixer 220 and the turbocharging device 400 disposed adjacent to the exhaust manifold 270 may also be realized smoothly.

Also, the intake manifold 260 may include a main portion 262 that guides the mixed gas introduced downward through the mixed gas inflow hole 261 in the horizontal direction and a plurality of branch portions 263 communicating with the main portion 262 and guiding the mixed gas, which is guided in the horizontal direction, upward to supply the mixed gas into the engine 200.

Thus, the mixed gas, which is introduced to be inclined downward through the mixed gas inflow hole 261 of the intake manifold 260, may flow in the horizontal direction while passing through the main portion 262 and then be branched into each of the branch portions 263 communicating with the main portion 262 to pass through the branch portions 263 to flow upward and be supplied into each of cylinders of the engine 200.

As described above, when the shape and arranged direction of the intake manifold 260 is changed, and thus the arrangement structure of the regulator 600 is changed, a distance between the outlet side of the intercooler 500 and the inlet side of the intake manifold 260 may be reduced to have a minimum value.

In addition, the distance between the intercooler 500 and the turbocharging device 400 is also minimized, and the distance between the turbocharging device 400, the exhaust manifold 270, and the mixer 220 may also be minimized.

Also, the discharge direction of the mixed gas of the intercooler 500 and the inflow direction of the mixed gas of the intake manifold 260 are the same or similar to each other, and thus, the flow path of the mixed gas may be provided as straight as possible, and thus, the mixed gas may quickly flow without being lost in a state in which the flow resistance (intake resistance) is minimized.

Also, in the flow path of the mixed gas, the regulator 600 is disposed in a direction parallel to the flow path so that the regulator 600 does not affect the flow of the mixed gas.

That is, in case of the present invention, when the turbocharging device 400 and the intercooler 500 are added to the engine module, in order to optimize the flow path, the outlet of the air filter 210 is provided at the exhaust manifold side, and the outlet of the air filter 210 and the tube 215 connecting the mixer 220 are provided as straight as possible. Also, it may be provided as horizontally as possible. Also, the distance between the mixer 220 and the turbocharging device 400 is narrowed as much as possible, and the turbocharging device 400 is directly connected to the exhaust manifold 270. Also, the intercooler 500 disposed between the turbocharging device 400 and the regulator 600 may be disposed at an optimal position based on the flow of the mixed gas. In detail, the intercooler 500 is disposed on another surface connecting the surface to which the exhaust manifold 270 was fixed and the surface to which the intake manifold 260 is fixed.

Here, both the intake side of the intake manifold 260 and the exhaust side of the exhaust manifold 270 are disposed near the surface on which the intercooler 500 is disposed.

Also, the inlet side of the intake manifold 260 is disposed at a portion that is closest to the outlet side of the intercooler 500, and thus, the shape and arranged direction of the intake manifold 260 are changed so that the inflow direction of the mixed gas is optimized to match conditions. Also, the regulator 600 is disposed on the passage of the mixed gas flowing from the intercooler 500 to the intake manifold 260.

As described above, the flow paths of the air and the mixed gas may be smoothly provided while drawing an overall 'U' shape from the exhaust manifold side to the intake manifold side, thereby minimizing the length of the passage and being structurally compact. As a result, the flow resistance may be reduced.

Hereinafter, the turbocharging device and the intercooler constituting the 'engine module' will be described with reference to FIGS. 8 and 13 to 14.

For reference, in the following description, a case in which a turbocharging device 400 is provided as a 'turbocharger' will be described as an example, but the scope of the present invention is not limited thereto, and the turbocharging device 400 may be applied in various manners known in the art.

First, the turbocharger 400 includes a turbine chamber 410 that receives an exhaust gas so that a turbine 411 (see FIG. 4) disposed therein rotates, a compression chamber 420 in which a mixed gas supplied from the mixer 220 is compressed while rotating together with the turbine 411, and a rotation shaft transmitting rotational force of the turbine chamber 410 to the compression chamber 420. Also, the compression chamber 420 may be provided with an impeller that is connected to the rotation shaft to rotates so as to compress the mixed gas introduced into the compression chamber 420.

According to this, the exhaust gas discharged from the exhaust manifold 270 is immediately introduced into the turbine chamber 410 to allow the turbine to rotate, and the rotational force is transmitted to the compression chamber 420 through the rotation shaft. Also, the mixed gas supplied from the mixer 220 is compressed by the rotating impeller connected to the rotation shaft 430 while passing through the inside of the compression chamber 420 and then discharged to the outside of the compression chamber 420 through the discharge tube 401 (see FIG. 15).

The compressed mixed gas discharged out of the compression chamber 420 as described above flows to the intercooler 500 to increase in density.

For example, the intercooler 500 may include a body portion 510 providing a space in which heat exchange between the cooling water supplied from the outside and the compressed mixed gas is performed and having both opened sides, an inflow portion 520 disposed at the opened one side of the body portion 510 and having an inflow tube 521 connected to an outlet side of the turbocharging device 400, and a discharge portion 530 having a discharge hole 531 defined in the other side of the body portion 510 and connected to an inlet side of the regulator 600.

Here, the discharge tube 401 of the compression chamber 420 may be directly connected to the inflow tube 521 of the intercooler 500.

For another example, the discharge tube 401 of the compression chamber 420 and the inflow tube 521 of the intercooler 500 may be connected to each other through a first connection tube 810 having a bent shape.

In detail, the intercooler 500 may be connected through the first connection tube 810 that is bent in the form of 'U' or 'J'.

The discharge tube 531 of the intercooler 500 may be provided to be inclined downward to discharge the mixed gas to the intake manifold 260, and the discharge tube 531 may be directly connected to the inflow hole 610 of the regulator 600.

For another example, the discharge tube 531 of the intercooler 500 may be connected to the inflow hole 610 of the regulator 600 through a second connection tube 820 having a bent shape.

In detail, the second connection tube 820 is provided to be inclined downward from the intercooler 500 to the regulator 600 and may have the bent form of ']'.

For another example, the second connection tube 820 may be provided in a straight line. For this, the discharge tube 531 of the intercooler 500 and the inflow hole 610 of the regulator 600 may be provided to face each other at the same angle.

In this case, the intake resistance of the mixed gas flowing into the regulator 600 may be minimized.

The discharge portion 620 (see FIG. 14) of the regulator 600 may be directly connected to the mixed gas inflow hole 261 (see FIG. 14) of the intake manifold 260.

When the regulator 600 and the intake manifold 260 are directly connected as described above, the tube for connecting the regulator 600 to the intake manifold 260 may be omitted to simplify the structure and shorten the flow path of the mixed gas.

The mixer 220 may be fixed to the intercooler 500.

For this, a mixer coupling portion 560 to which the mixer 220 is coupled may be disposed at the inflow portion 520 of the intercooler 500.

The mixer coupling part 560 may be integrated with the inflow hole 520 and have a hollow shape so that the mixed gas is discharged to the turbocharging device 400 after the mixed gas passing through the mixer 220 is introduced.

Thus, the mixed gas discharged from the mixer 220 may pass through the hollow 561 of the mixer coupling part 560 and then be introduced into the turbocharging device 400 through the third tube (see reference numeral '830' in FIG. 14) that is bent in the form of '⊏'. Accordingly, the mixer 220 may be fixed to the engine 200, as well as alignment of the mixer 220 may be easily performed.

Also, the engine module further includes an air filter 210 for purifying external air, and at least a portion of an air tube 215 connecting the air filter 210 to the mixer 220 may be provided in a straight line.

When the air tube 215 is provided in a straight line as described above, air flowability may be improved. That is, in a straight-line section, the flow of the air is smoothly performed so that the air supply to the mixer 220 is easily performed.

In addition, a portion of the air tube 215 may be provided in the form of a curve.

Also, the air filter 210 and the mixer 220 may be fixed at the same height.

When the air filter 210 and the mixer 220 are fixed to the same height as described above, the air flow is more smoothly performed, and thus, the air supply to the mixer 220 may be more easily performed.

According to the present invention as described above, it is possible to minimize air intake resistance of the mixer 220 by providing the air tube 215 connecting the air filter 210 to the mixer 220 in a horizontal and straight line.

FIG. 17 is a perspective view of the engine module provided with the cooling water pump.

Referring to FIG. 17, the engine module further includes an exhaust gas heat exchanger 240 that exchanges heat between the exhaust gas and the cooling water passing through the turbocharging device 400.

Here, the exhaust gas heat exchanger 240 may be directly fixed to the engine 200. In detail, the exhaust gas heat exchanger 240 may be directly fixed to the exhaust manifold 270 of the engine 200. Here, a fixing portion such as a clamp for fixing the exhaust gas heat exchanger 240 to the exhaust manifold 270 may be separately provided.

Accordingly, the exhaust gas discharged from the exhaust manifold 270 allows the turbine 411 to rotate while passing through the turbine chamber 410 of the turbocharging device 400, and the exhaust gas discharged from the turbine chamber 410 is heat-exchanged with the cooling water while passing through the exhaust gas heat exchanger 240.

The exhaust gas passing through the exhaust gas heat exchanger 240 has a low temperature through heat dissipation and is discharged to the atmosphere through a muffler. The cooling water passing through the exhaust gas heat exchanger 240 increase in temperature through heat absorption and is collected to the cooling water tank through the exhaust manifold 270 and the radiator.

Here, similarly, the exhaust gas heat exchanger 240 and the turbine chamber 410 of the turbocharging device 400 may be directly connected to each other without a separate tube. That is, a first discharge hole (not shown) of the turbine chamber 410 and an exhaust gas inflow hole 241 of the exhaust gas heat exchanger 240 may be directly connected to each other.

For example, the first discharge hole (not shown) and the exhaust gas inflow hole 241 form flanges 413 extending outward along a circumference thereof, and in the state in which the flanges 413 contact each other, the flanges 413 may be connected to each other by coupling the coupling portion such as the bolt.

Hereinafter, a flow of the cooling water will be described in detail with reference to FIG. 17.

First, when the cooling water pump 300 is driven, primary heat exchange is performed while the cooling water stored in the cooling water tank passes through the exhaust gas heat exchanger 240, and then, secondary heat exchange is performed while passing through the exhaust manifold 270. As the cooling water flows as described above, an exhaust gas temperature of each of the exhaust manifold 270 and the exhaust gas heat exchanger 240 may decrease. The cooling water heated while passing through the exhaust manifold 270 decreases in temperature while passing through the radiator and then is collected again to the cooling water tank.

Also, a portion of the cooling water passing through the exhaust gas heat exchanger 240 may be branched to cool the turbocharging device 400 while passing through the turbocharging device 400, and also the cooling water passing through the turbocharging device 400 decreases in temperature while passing through the radiator and then is collected again to the cooling water tank.

The radiator may be installed at one side of the outdoor heat exchanger, and the cooling water passing through the radiator may be heat-exchanged with external air by driving the outdoor fan. In this process, the refrigerant may be cooled.

Hereinafter, an overall operation of the engine module will be described with reference again to FIG. 14.

First, the air purified while passing through the air filter 210 and the fuel (LNG) passing through the zero governor are mixed in the mixer 220.

After the mixed gas (air and LNG) mixed in the mixer 220 is discharged from the mixer 220, the mixer 220 passes through the mixer coupling portion 560 of the fixed intercooler 500 and passes through the third tube 830 having a bent shape and then is introduced into the turbocharging device 400.

Here, the turbocharging device 400 is coupled to the exhaust manifold 270 of the engine 200, and the turbocharging device 400 rotates by receiving the power from the exhaust gas of the engine 200, and the mixed gas introduced into the turbocharging device 400 is compressed at a high temperature and high pressure.

Thereafter, the mixed gas compressed in the turbocharging device 400 flows to the intercooler 500 through the discharge tube 401 and the first connection tube 810 having the bent shape.

In detail, the compressed mixed gas is introduced through the first connection tube 810 connected to the discharge tube 401 and the inflow tube 521 connected to the first connection tube 810, and the mixed gas introduced into the body portion 510 via the inflow portion 520 is cooled while being heat-exchanged with the cooling water passing through the body portion 510 to increase in density.

Thereafter, the mixed gas having the increasing density is discharged from the intercooler 500 through the discharge portion 530 and the discharge tube 531 and then is introduced into the regulator 600 through the second connection tube 820 connected to the discharge tube 531.

The regulator 600 adjusts an amount of mixed gas introduced from the intercooler 500 to discharge the mixed gas to the engine 200, and then, the mixed gas that is adjusted in amount is introduced into through the intake manifold 260 of the engine 200.

Here, the outlet of the regulator 600 and the inlet of the intake manifold 260 may be directly connected to each other, and thus, the regulator 600 may be fixed to the intake manifold 260, the structure becomes compact, and the intake resistance may be reduced.

Also, even if the shape of the passage through which the mixed gas flows is complicated, the length of the passage through which the mixed gas flows is reduced to have a minimum value, the discharge direction of the mixed gas of the intercooler 500 and the inflow direction of the mixed gas of the intake manifold 260 and the regulator 600 are designed to be smooth, thereby minimizing the flow resistance of the mixed gas.

When the mixed gas is introduced into the engine 200 via the intake manifold 260 as described above, combustion is performed inside the engine 200 to generate power for driving the compressor.

The exhaust gas generated in the combustion process is discharged to the outside of the engine 200 through the exhaust manifold 270.

The turbocharging device 400 is connected to the exhaust manifold 270, and the exhaust gas discharged from the exhaust manifold 270 is supplied to the turbocharging device 400 to allow the turbine of the turbocharging device 400 to rotate. Accordingly, the turbocharging device 400 may compress the mixed gas introduced from the mixer 220.

The exhaust gas passing through the turbocharging device 400 is heat-exchanged with the cooling water provided from the cooling water pump 300 while passing through the exhaust gas heat exchanger 240. As described above, the exhaust gas that has undergone the heat exchange is provided to an outlet side of the exhaust gas heat exchanger 240 to pass through the muffler 250 for reducing noise of the exhaust gas and then is discharged to the outside.

After being discharged from the cooling water pump 300, the cooling water, which has undergone the heat exchange in the exhaust gas heat exchanger 240, is supplied to the exhaust manifold 270 through a separate tube, and the cooling water passing through the exhaust manifold 270 is discharged to the outside of the engine 200 to pass through the radiator and then is collected into the cooling water tank connected to the cooling water pump 300.

Also, after being discharged from the cooling water pump 300, a portion of the cooling water, which has undergone the heat exchange in the exhaust gas heat exchanger 240, may be branched through a separate connection tube 350 before flowing to the exhaust manifold 270 and is supplied to the turbocharging device 400, and then, the heat-exchanged cooling water may be collected into the cooling water tank connected to the cooling water pump 300 after passing through the exhaust manifold 270 and the radiator.

According to the present invention as described above, the components such as the turbocharging device 400, the intercooler 500, the regulator 600, and the like may be fixed to the engine 200 itself rather than the separate structure that is separated from the engine 200 to omit the structure for fixing each of the components.

In addition, each of the components may be fixed to the engine 200 to reduce distances between the regulator 600 and the intake manifold 260, between the turbocharging device 400 and the exhaust manifold 270, and between the intercooler 500 and the turbocharging device 400 and thus reduce the length of the entire tube, thereby reducing the surface area occupied by the tube.

In addition, the components such as the turbocharging device 400, the intercooler 500, the regulator 600, and the like may be fixed to the engine 200 to prevent the relative movement phenomenon in which the turbocharging device 400, the intercooler 500, the regulator 600, and the like move in opposite directions from occurring when the engine is driven, so as to reduce the vibration applied to the tube and the connected portion and prevent the phenomena in which the tube and the various connected portions are loose or damaged by the vibration, thereby improving the durability and preventing the safety accidents.

The invention claimed is:

1. A gas heat pump system, comprising:
    an air-conditioning module comprising a compressor, an outdoor heat exchanger, an expansion device, an indoor heat exchanger, and a refrigerant tube; and
    an engine module comprising an engine in which a mixed gas of a fuel and air is burned to provide power for an operation of the compressor, wherein the engine module comprises:
        a mixer in which the air and the fuel are mixed to be discharged;
        a turbocharging device configured to receive the mixed gas discharged from the mixer so as to compress and discharge the mixed gas;
        an intercooler configured to receive the mixed gas compressed in the turbocharging device so as to cool the mixed gas in a heat-exchange manner to increase in density, thereby discharging the mixed gas;
        a regulator configured to receive the mixed gas discharged from the intercooler so as to control an amount of mixed gas and supply the mixed gas to the engine; and
        an exhaust gas heat exchanger configured to heat-exchange an exhaust gas discharged from the engine with cooling water, wherein the exhaust gas heat exchanger includes a first side, through which the exhaust gas is introduced, and a second side, through which the exhaust gas is discharged and which is disposed lower than the first side so that the exhaust gas heat exchanger is inclined downward from the first side to the second side, wherein the exhaust gas flows from the first side to the second side of the exhaust gas heat exchanger, wherein condensed water generated in the exhaust gas heat exchanger flows from the first side to the second side of the exhaust gas heat exchanger, and wherein the cooling water flows from the second side to the first side of the exhaust gas heat exchanger.

2. The gas heat pump system according to claim 1, wherein the turbocharging device is provided as a turbocharger that is driven by the exhaust gas of the engine, and the exhaust gas heat exchanger is configured to receive the exhaust gas passing through the turbocharging device so as to be heat-exchanged with the cooling water.

3. The gas heat pump system according to claim 2, wherein a discharge hole of the turbocharging device and a suction hole of the heat exchanger are directly connected to each other.

4. The gas heat pump system according to claim 3, wherein each of the discharge hole of the turbocharging device and the suction hole of the heat exchanger is provided with a flange protruding along a circumference thereof, and in a state in which the flanges contact each other, the flanges are coupled to be connected to each other by using a coupling portion.

5. The gas heat pump system according to claim 1, wherein the exhaust gas heat exchanger is directly fixed to the engine.

6. The gas heat pump system according to claim 5, wherein the engine module further comprises a grip portion having a first side coupled to the exhaust gas heat exchanger in a manner of gripping the exhaust gas heat exchanger and a second side fixed to the engine.

7. The gas heat pump system according to claim 1, wherein the second side of the exhaust gas heat exchanger, through which the exhaust gas is discharged, is fixed to the engine by a separate support frame.

8. The gas heat pump system according to claim 7, wherein an exhaust gas discharge tube provided to face a lower side, an extension portion extending in a direction crossing the exhaust gas discharge tube, and a protrusion protruding downward from a bottom surface of the extension portion are disposed at the second side of the exhaust gas heat exchanger, and an upper end of the separate support frame is disposed parallel to the extension portion so as to be coupled to the protrusion at a lower side of the extension portion.

9. The gas heat pump system according to claim 1, wherein the exhaust gas heat exchanger comprises:
    a cooling water inflow tube which is provided at the second side through which the exhaust gas is discharged and into which the cooling water is introduced;
    a heat exchanging chamber in which the introduced cooling water and the exhaust gas are heat-exchanged with each other; and
    a cooling water discharge tube which is provided at the first side through which the exhaust gas is introduced and from which the cooling water heat-exchanged with the exhaust gas is discharged.

10. The gas heat pump system according to claim 9, wherein the engine module is provided with a cooling water pump and a cooling water tube, through which the cooling water flows to the exhaust gas heat exchanger or the turbocharging device.

11. The gas heat pump system according to claim 10, wherein the cooling water tube comprises:
    a first main tube configured to connect the cooling water pump to the cooling water inflow tube of the exhaust gas heat exchanger; and
    a second main tube configured to connect the cooling water discharge tube of the exhaust gas heat exchanger to an exhaust manifold of the engine.

12. The gas heat pump system according to claim 10, wherein a branch hole through which the cooling water is supplied toward the turbocharging device is defined in the cooling water discharge tube of the exhaust gas heat exchanger.

13. The gas heat pump system according to claim 12, wherein the cooling water tube comprises:
    a first branch tube configured to the branch hole to the turbocharging device; and
    a second branch tube configured to the turbocharging device to an exhaust manifold of the engine.

14. The gas heat pump system according to claim 1, wherein the exhaust gas passing through the exhaust gas heat exchanger flows to a silencer through an exhaust tube.

15. The gas heat pump system according to claim 14, wherein the condensed water flows along the exhaust tube and is discharged to the outside.

16. The gas heat pump system according to claim 15, wherein the condensed water flowing to the exhaust tube is discharged to the outside through a condensed water discharge hole defined in a drain filter.

17. The gas heat pump system according to claim 1, wherein the mixer, the turbocharging device, and the exhaust gas heat exchanger are provided adjacent to an exhaust manifold disposed on a first surface of the engine, the regulator is provided adjacent to an intake manifold disposed on a second surface opposite to the first surface, and the intercooler is fixed to a third surface crossing the first surface and the second surface.

18. The gas heat pump system according to claim 1, wherein the fuel comprises household LNG or LPG.

19. The gas heat pump system according to claim 1, further comprising an intake manifold into which the mixed gas supplied from the regulator is introduced, wherein a first mixed gas inflow hole of the intake manifold and a first mixed gas discharge hole of the regulator are directly connected to each other.

20. The gas heat pump system according to claim 19, wherein the turbocharging device is provided adjacent to an exhaust manifold disposed on a first surface of the engine, the regulator is provided adjacent to the intake manifold disposed on a second surface opposite to the first surface, and the intercooler is fixed to a third surface crossing the first surface and the second surface.

21. The gas heat pump system according to claim 20, wherein the intercooler is disposed above the turbocharging device or the regulator.

22. The gas heat pump system according to claim 21, wherein the intercooler is provided with a discharge tube having a downwardly inclined shape so that the mixed gas is discharged toward the intake manifold.

23. The gas heat pump system according to claim 22, wherein a connection tube having a bent shape and configured to guide a flow of the mixed gas downward from an upper side is provided between the discharge tube and a second mixed gas inflow hole of the regulator.

24. The gas heat pump system according to claim 23, wherein the first mixed gas discharge hole of the regulator is opened to a lower side, and the first mixed gas inflow hole of the intake manifold is opened to an upper side.

25. The gas heat pump system according to claim 24, wherein the intake manifold comprises:
   a main portion configured to guide the mixed gas, which is introduced downward through the mixed gas inflow hole, in a horizontal direction; and
   a plurality of branch portions, each of which communicates with the main portion, the plurality of branch portions being configured to guide the mixed gas, which is guided in the horizontal direction, upward in a vertical direction so as to supply the mixed gas to the engine.

26. The gas heat pump system according to claim 25, wherein the intake manifold is disposed to be erected parallel to the second surface of the engine.

27. The gas heat pump system according to claim 19, wherein the mixer is fixed to the intercooler.

28. The gas heat pump system according to claim 19, wherein the engine module further comprises an air filter configured to purify external air, and at least a portion of an air tube configured to connect the air filter to the mixer has a straight-line shape.

29. The gas heat pump system according to claim 28, wherein the air filter and the mixer are fixed at the same height.

30. The gas heat pump system according to claim 10, wherein the cooling water tube comprises a third main tube configured to guide the cooling water passing through the exhaust manifold of the engine to a radiator.

* * * * *